(12) United States Patent
Matsuoka et al.

(10) Patent No.: US 7,645,394 B2
(45) Date of Patent: Jan. 12, 2010

(54) ANTIFREEZE COMPOSITION COMPRISING BENZIMIDAZOLE AND TRIAZINE

(75) Inventors: Susumu Matsuoka, Tokyo (JP); Isao Shinoda, Tokyo (JP); Yasuhiro Kishimoto, Tokyo (JP)

(73) Assignees: Honda Motor Co. Ltd., Tokyo (JP); Asahi Denka Co., Ltd., Tokyo (JP)

(*) Notice: Subject to any disclaimer, the term of this patent is extended or adjusted under 35 U.S.C. 154(b) by 427 days.

(21) Appl. No.: 11/002,892

(22) Filed: Dec. 3, 2004

(65) Prior Publication Data
US 2005/0121646 A1 Jun. 9, 2005

(30) Foreign Application Priority Data
Dec. 4, 2003 (JP) ............................. 2003-406561

(51) Int. Cl.
*C09K 5/00* (2006.01)
(52) U.S. Cl. .............................. 252/71; 252/73; 252/74; 252/75
(58) Field of Classification Search ........................ None
See application file for complete search history.

(56) References Cited

U.S. PATENT DOCUMENTS

| 5,342,548 A | * | 8/1994 | Yorke et al. | ................. 252/391 |
| 5,723,061 A | | 3/1998 | Ciardi et al. | |
| 6,309,559 B1 | | 10/2001 | Minks et al. | |

2004/0119044 A1 * 6/2004 Wenderoth et al. ............ 252/71

FOREIGN PATENT DOCUMENTS

| JP | 61-011984 | 1/1986 |
| JP | 1-315481 | 12/1989 |
| JP | 01-315481 | 12/1989 |
| JP | 4-59885 | 2/1992 |
| JP | 07-268316 | 10/1995 |
| JP | 8-85782 | 4/1996 |
| JP | 08-085782 | 4/1996 |
| JP | 8-311670 | 11/1996 |
| JP | 9-504812 | 5/1997 |
| JP | 10-338868 | 12/1998 |
| JP | 2003-504453 | 2/2003 |
| JP | 2004-238643 | 8/2004 |
| KR | 1998-037435 | 8/1998 |
| WO | 02/08354 A1 | 1/2002 |

* cited by examiner

*Primary Examiner*—Necholus Ogden, Jr.
(74) *Attorney, Agent, or Firm*—Arent Fox LLP

(57) ABSTRACT

The antifreeze of the present invention is including propylene glycol, first material, and second material. The first material is normal aliphatic dicarboxylic acid in which number of carbon atoms is from 10 to 12, salt of the normal aliphatic dicarboxylic acid, or mixture thereof. The second material is benzimidazole compound which has a benzimidazole skeleton, salt of the benzimidazole compound, triazine compound which has a triazine skeleton and has a mercapto group, salt of the triazine compound, or mixture thereof. Such antifreeze has less environment load than antifreeze including ethylene glycol. Furthermore, such antifreeze does not cause metal to corrode more than the antifreeze including ethylene glycol.

16 Claims, 7 Drawing Sheets

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| SAMPLE 1 | 100 | 100 | 100 | 100 | 100 |
| SAMPLE 2 | - | - | 1.2 | - | 1.2 |
| SAMPLE 5 | - | 0.1 | - | 0.1 | - |
| SAMPLE 7 | - | - | - | 1.0 | 1.0 |
| SAMPLE 11 | - | - | - | 0.5 | 0.5 |
| SAMPLE 12 | ADDED SO THAT PH OF ANTIFREEZE COMPOSITIONS WILL BE BELOW FIGURES | | | | |
| pH | 7.8 | 7.8 | 7.8 | 7.8 | 7.8 |
| SAMPLE 13 | ADDED SO THAT CONCENTRATION OF SAMPLE 1 WILL BE BELOW FIGURES | | | | |
| CONCENTRATION OF SAMPLE 1 (% BY WEIGHT) | 30 | 30 | 30 | 30 | 30 |
| CORROSION TEST FOR BEHAVIOR METALS — ALUMINUM CASTING | -1.66 | -0.64 | -1.23 | -0.51 | -0.77 |
| IRON CASTING | -3.12 | -0.68 | -0.52 | -0.61 | -0.36 |
| STEEL | -9.94 | -1.74 | -0.31 | -0.42 | -0.25 |
| BRASS | -0.09 | -0.07 | -0.10 | 0.05 | 0.05 |
| SOLDER | -0.96 | -0.48 | -0.33 | -0.53 | -0.15 |
| COPPER | -0.09 | -0.05 | -0.11 | 0.03 | -0.08 |

Fig. 1

| | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| SAMPLE 1 | 100 | 100 | 100 | 100 | 100 |
| SAMPLE 2 | - | - | 1.2 | - | 1.2 |
| SAMPLE 5 | - | 0.1 | - | 0.1 | - |
| SAMPLE 7 | - | - | - | 1.0 | 1.0 |
| SAMPLE 11 | - | - | - | 0.5 | 0.5 |
| SAMPLE 12 | ADDED SO THAT PH OF ANTIFREEZE COMPOSITIONS WILL BE BELOW FIGURES | | | | |
| pH | 7.8 | 7.8 | 7.8 | 7.8 | 7.8 |
| SAMPLE 13 | ADDED SO THAT CONCENTRATION OF SAMPLE 1 WILL BE BELOW FIGURES | | | | |
| CONCENTRATION OF SAMPLE 1 (% BY WEIGHT) | 30 | 30 | 30 | 30 | 30 |
| CORROSION BEHAVIOR TEST FOR METALS — ALUMINUM CASTING | -1.66 | -0.64 | -1.23 | -0.51 | -0.77 |
| IRON CASTING | -3.12 | -0.68 | -0.52 | -0.61 | -0.36 |
| STEEL | -9.94 | -1.74 | -0.31 | -0.42 | -0.25 |
| BRASS | -0.09 | -0.07 | -0.10 | 0.05 | 0.05 |
| SOLDER | -0.96 | -0.48 | -0.33 | -0.53 | -0.15 |
| COPPER | -0.09 | -0.05 | -0.11 | 0.03 | -0.08 |

Fig. 2

| | EMBODIMENT 1 | EMBODIMENT 2 | EMBODIMENT 3 | EMBODIMENT 4 | EMBODIMENT 5 | EMBODIMENT 6 | EMBODIMENT 7 | EMBODIMENT 8 | EMBODIMENT 9 |
|---|---|---|---|---|---|---|---|---|---|
| SAMPLE 1 | 100 | 100 | 100 | 100 | 100 | 100 | 100 | 100 | 100 |
| SAMPLE 2 | 0.2 | 0.5 | 1.2 | 2.0 | 4.0 | 1.2 | 1.2 | 1.2 | 1.2 |
| SAMPLE 5 | 0.1 | 0.1 | 0.1 | 0.1 | 0.1 | 0.023 | 0.05 | 0.2 | 0.35 |
| SAMPLE 12 | ADDED SO THAT PH OF ANTIFREEZE COMPOSITIONS WILL BE BELOW FIGURES | | | | | | | | |
| pH | 7.8 | 7.8 | 7.8 | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | | | | |
| CONCENTRATION OF SAMPLE 1 (% BY WEIGHT) | 30 | 30 | 30 | 30 | 30 | 30 | 30 | 30 | 30 |
| CORROSION BEHAVIOR TEST FOR METALS — ALUMINUM CASTING | -0.29 | -0.27 | -0.23 | -0.25 | -0.20 | -0.28 | -0.25 | -0.22 | -0.18 |
| IRON CASTING | -0.15 | -0.14 | -0.05 | -0.05 | -0.04 | -0.10 | -0.08 | -0.08 | -0.06 |
| STEEL | -0.09 | -0.07 | -0.02 | -0.02 | -0.02 | -0.05 | -0.03 | -0.03 | -0.02 |
| BRASS | -0.03 | -0.04 | -0.04 | -0.03 | -0.05 | -0.09 | -0.07 | -0.05 | -0.02 |
| SOLDER | -0.27 | -0.20 | -0.15 | -0.17 | -0.17 | -0.27 | -0.24 | -0.16 | -0.16 |
| COPPER | -0.06 | -0.06 | -0.05 | -0.05 | -0.05 | -0.13 | -0.12 | -0.08 | -0.03 |

Fig. 3

|  | EMBODIMENT 10 | EMBODIMENT 11 | EMBODIMENT 12 | EMBODIMENT 13 | EMBODIMENT 14 | EMBODIMENT 15 | EMBODIMENT 16 | EMBODIMENT 17 | EMBODIMENT 18 | EMBODIMENT 19 |
|---|---|---|---|---|---|---|---|---|---|---|
| SAMPLE 1 | 100 | 100 | 100 | 100 | 100 | 100 | 100 | 100 | 100 | 100 |
| SAMPLE 2 | - | - | 0.6 | - | 0.6 | 0.4 | 1.2 | 1.2 | 1.2 | 1.2 |
| SAMPLE 3 | 1.2 | - | 0.6 | 0.6 | - | 0.4 | - | - | - | - |
| SAMPLE 4 | - | 1.2 | - | 0.6 | 0.6 | 0.4 | - | - | - | - |
| SAMPLE 5 | 0.1 | 0.1 | 0.1 | 0.1 | 0.1 | 0.1 | - | - | - | - |
| SAMPLE 6 | - | - | - | - | - | - | 0.07 | 0.5 | 1.0 | 0.08 |
| SAMPLE 12 | ADDED SO THAT PH OF ANTIFREEZE COMPOSITIONS WILL BE BELOW FIGURES | | | | | | | | | 0.3 |
| pH | 7.8 | 7.8 | 7.8 | 7.8 | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | | | | | |
| CONCENTRATION OF SAMPLE 1 (% BY WEIGHT) | 30 | 30 | 30 | 30 | 30 | 30 | 30 | 30 | 30 | 30 |
| CORROSION BEHAVIOR TEST FOR METALS — ALUMINUM CASTING | -0.24 | -0.28 | -0.24 | -0.26 | -0.25 | -0.25 | -0.28 | -0.28 | -0.21 | -0.19 |
| IRON CASTING | -0.06 | -0.08 | -0.07 | -0.08 | -0.08 | -0.08 | -0.12 | -0.05 | -0.08 | -0.09 |
| STEEL | -0.02 | -0.03 | -0.04 | -0.04 | -0.04 | -0.03 | -0.08 | -0.05 | -0.03 | -0.03 |
| BRASS | -0.05 | -0.04 | -0.04 | -0.05 | -0.04 | -0.04 | -0.12 | -0.09 | -0.05 | -0.04 |
| SOLDER | -0.19 | -0.18 | -0.17 | -0.18 | -0.19 | -0.18 | -0.29 | -0.27 | -0.15 | -0.14 |
| COPPER | -0.07 | -0.09 | -0.05 | -0.09 | -0.08 | -0.09 | -0.15 | -0.12 | -0.08 | -0.07 |

Fig. 4

| | EMBODIMENT 20 | EMBODIMENT 21 | EMBODIMENT 22 | EMBODIMENT 23 | EMBODIMENT 24 | EMBODIMENT 25 | EMBODIMENT 26 | EMBODIMENT 27 | EMBODIMENT 28 | EMBODIMENT 29 |
|---|---|---|---|---|---|---|---|---|---|---|
| SAMPLE 1 | 100 | 100 | 100 | 100 | 100 | 100 | 100 | 100 | 100 | 100 |
| SAMPLE 2 | 1.2 | 1.2 | 1.2 | 1.2 | 1.2 | 1.2 | 1.2 | 1.2 | 1.2 | 1.2 |
| SAMPLE 5 | 0.1 | 0.1 | 0.1 | 0.1 | 0.1 | 0.1 | 0.1 | 0.1 | 0.1 | 0.1 |
| SAMPLE 7 | 0.05 | 1.0 | 3.0 | - | - | - | - | - | - | 1.0 |
| SAMPLE 8 | - | - | - | 1.0 | - | - | - | - | - | - |
| SAMPLE 9 | - | - | - | - | 1.0 | - | - | - | - | - |
| SAMPLE 10 | - | - | - | - | - | 1.0 | - | - | - | - |
| SAMPLE 11 | - | - | - | - | - | - | 0.05 | 0.5 | 0.9 | 0.5 |
| SAMPLE 12 | ADDED SO THAT pH OF ANTIFREEZE COMPOSITIONS WILL BE BELOW FIGURES | | | | | | | | | |
| pH | 7.8 | 7.8 | 7.8 | 7.8 | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | | | | | |
| CONCENTRATION OF SAMPLE 1 (% BY WEIGHT) | 30 | 30 | 30 | 30 | 30 | 30 | 30 | 30 | 30 | 30 |
| CORROSION BEHAVIOR TEST FOR METALS — ALUMINUM CASTING | -0.19 | -0.10 | -0.15 | -0.07 | -0.09 | -0.09 | -0.07 | -0.09 | -0.12 | -0.01 |
| IRON CASTING | -0.04 | -0.09 | -0.10 | -0.02 | -0.07 | -0.07 | -0.05 | -0.03 | -0.10 | -0.03 |
| STEEL | -0.01 | 0.02 | -0.03 | -0.01 | -0.02 | 0.00 | -0.02 | 0.00 | -0.02 | 0.00 |
| BRASS | -0.04 | -0.02 | -0.04 | -0.03 | -0.02 | -0.02 | -0.02 | -0.02 | -0.01 | -0.01 |
| SOLDER | -0.15 | -0.12 | -0.14 | -0.11 | -0.10 | -0.10 | -0.08 | -0.08 | -0.08 | -0.08 |
| COPPER | -0.05 | -0.03 | -0.05 | -0.04 | -0.04 | -0.04 | -0.03 | -0.03 | -0.02 | -0.02 |

Fig. 5

| | EMBODIMENT 30 | EMBODIMENT 31 | EMBODIMENT 32 | EMBODIMENT 33 | EMBODIMENT 34 | EMBODIMENT 35 |
|---|---|---|---|---|---|---|
| SAMPLE 1 | 100 | 100 | 100 | 100 | 100 | 100 |
| SAMPLE 2 | - | - | - | - | - | 0.6 |
| SAMPLE 14 | 1.2 | - | - | - | - | 0.6 |
| SAMPLE 15 | - | 1.2 | - | - | - | - |
| SAMPLE 16 | - | - | 1.2 | - | - | - |
| SAMPLE 17 | - | - | - | 1.2 | - | - |
| SAMPLE 18 | - | - | - | - | 1.2 | - |
| SAMPLE 5 | 0.1 | 0.1 | 0.1 | 0.1 | 0.1 | 0.1 |
| SAMPLE 12 | ADDED SO THAT pH OF ANTIFREEZE COMPOSITIONS WILL BE BELOW FIGURES | | | | | |
| pH | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | |
| CONCENTRATION OF SAMPLE 1 (% BY WEIGHT) | 30 | 30 | 30 | 30 | 30 | 30 |
| CORROSION BEHAVIOR TEST FOR METALS — ALUMINUM CASTING | -0.26 | -0.25 | -0.25 | -0.28 | -0.28 | -0.21 |
| IRON CASTING | -0.07 | -0.08 | -0.14 | -0.07 | -0.09 | -0.10 |
| STEEL | -0.03 | -0.05 | -0.11 | -0.03 | -0.05 | -0.04 |
| BRASS | -0.06 | -0.04 | -0.02 | -0.04 | -0.05 | -0.05 |
| SOLDER | -0.21 | -0.17 | -0.10 | -0.15 | -0.17 | -0.14 |
| COPPER | -0.09 | -0.08 | -0.04 | -0.09 | -0.11 | -0.10 |

Fig. 6

| | EMBODIMENT 36 | EMBODIMENT 37 | EMBODIMENT 38 | EMBODIMENT 39 | EMBODIMENT 40 | EMBODIMENT 41 | EMBODIMENT 42 |
|---|---|---|---|---|---|---|---|
| SAMPLE 1 | 100 | 100 | 100 | 100 | 100 | 100 | 100 |
| SAMPLE 2 | 1.2 | 1.2 | 1.2 | 1.2 | 1.2 | 1.2 | 1.2 |
| SAMPLE 5 | 0.1 | 0.1 | 0.1 | 0.1 | 0.1 | 0.1 | 0.1 |
| SAMPLE 7 | – | – | – | – | – | – | 0.05 |
| SAMPLE 19 | 1.0 | – | – | – | – | – | 0.05 |
| SAMPLE 20 | – | 1.0 | – | – | – | – | – |
| SAMPLE 21 | – | – | 1.0 | – | – | – | – |
| SAMPLE 22 | – | – | – | 1.0 | – | – | – |
| SAMPLE 23 | – | – | – | – | 1.0 | – | – |
| SAMPLE 24 | – | – | – | – | – | 1.0 | – |
| SAMPLE 12 | ADDED SO THAT PH OF ANTIFREEZE COMPOSITIONS WILL BE BELOW FIGURES | | | | | | |
| pH | 7.8 | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | | |
| CONCENTRATION OF SAMPLE 1 (% BY WEIGHT) | 30 | 30 | 30 | 30 | 30 | 30 | 30 |
| CORROSION BEHAVIOR TEST FOR METALS — ALUMINUM CASTING | -0.10 | -0.09 | -0.10 | -0.12 | -0.10 | -0.09 | -0.09 |
| IRON CASTING | -0.07 | -0.07 | -0.09 | -0.08 | -0.07 | -0.06 | -0.08 |
| STEEL | -0.02 | -0.03 | -0.04 | -0.02 | -0.03 | -0.01 | -0.03 |
| BRASS | -0.03 | -0.02 | 0.00 | -0.03 | -0.03 | -0.03 | -0.03 |
| SOLDER | -0.15 | -0.10 | -0.10 | -0.16 | -0.09 | -0.11 | -0.16 |
| COPPER | -0.05 | -0.04 | -0.02 | -0.05 | -0.05 | -0.05 | -0.06 |

Fig. 7

| | EMBODIMENT 43 | EMBODIMENT 44 | EMBODIMENT 45 | EMBODIMENT 46 | EMBODIMENT 47 | EMBODIMENT 48 | EMBODIMENT 49 | EMBODIMENT 50 |
|---|---|---|---|---|---|---|---|---|
| SAMPLE 1 | 100 | 100 | 100 | 100 | 100 | 100 | 100 | 100 |
| SAMPLE 2 | 1.2 | 1.2 | 1.2 | 1.2 | 1.2 | 1.2 | 1.2 | 1.2 |
| SAMPLE 5 | 0.1 | 0.1 | 0.1 | 0.1 | 0.1 | 0.1 | 0.1 | 0.1 |
| SAMPLE 7 | – | – | – | – | 1.0 | 1.0 | 1.0 | 1.0 |
| SAMPLE 11 | – | – | – | 0.25 | – | – | – | 0.25 |
| SAMPLE 25 | 0.5 | – | – | 0.25 | 0.5 | – | – | 0.25 |
| SAMPLE 26 | – | 0.5 | – | – | – | – | – | – |
| SAMPLE 27 | – | – | 0.5 | – | – | 0.5 | 0.5 | – |
| SAMPLE 12 | ADDED SO THAT PH OF ANTIFREEZE COMPOSITIONS WILL BE BELOW FIGURES | | | | | | | |
| pH | 7.8 | 7.8 | 7.8 | 7.8 | 7.8 | 7.8 | 7.8 | 7.8 |
| SAMPLE 13 | ADDED SO THAT CONCENTRATION OF SAMPLE 1 WILL BE BELOW FIGURES | | | | | | | |
| CONCENTRATION OF SAMPLE 1 (% BY WEIGHT) | 30 | 30 | 30 | 30 | 30 | 30 | 30 | 30 |
| CORROSION BEHAVIOR TEST FOR METALS — ALUMINUM CASTING | -0.10 | -0.09 | -0.08 | -0.09 | -0.01 | -0.01 | -0.02 | -0.02 |
| IRON CASTING | -0.04 | -0.05 | -0.07 | -0.03 | -0.04 | -0.02 | -0.06 | -0.03 |
| STEEL | -0.01 | -0.03 | -0.06 | -0.01 | -0.03 | -0.01 | -0.03 | -0.02 |
| BRASS | -0.02 | -0.03 | -0.03 | -0.02 | -0.01 | 0.00 | -0.01 | -0.01 |
| SOLDER | -0.07 | -0.06 | -0.09 | -0.07 | -0.09 | -0.06 | -0.08 | -0.06 |
| COPPER | -0.04 | -0.05 | -0.04 | -0.03 | -0.02 | -0.02 | -0.02 | -0.02 |

ANTIFREEZE COMPOSITION COMPRISING BENZIMIDAZOLE AND TRIAZINE

BACKGROUND OF THE INVENTION

1. Field of the Invention

The present invention relates to antifreeze, and particularly to antifreeze used as coolant.

2. Description of the Related Art

The internal combustion engine which is applied to automobiles and so on is cooled by the coolant. As the coolant, antifreeze is used in order to prevent freezing up in the cold season. As the antifreeze, generally, the one which is diluted with water after adding rust inhibitor to glycols which is used as freezing-point depressant is used. Especially, ethylene glycol is often used as such freezing-point depressant. Propylene glycol which gives less environmental load than ethylene glycol is desired to be added in the antifreeze as the freezing-point depressant.

Aluminum, cast iron, steel, brass, solder, copper, and so on are existing in the cooling system of the internal combustion engine. Accordingly, a corrosion-preventing effect on the above materials is required for the coolant, and the coolant contains various corrosion inhibitors. Especially, the corrosion-preventing effect on aluminum is required, because the amount of aluminum used in the coolant system tends to increase for the purpose of saving the weight of automobiles. Therefore, the antifreeze which includes propylene glycol having less environmental load is desired as the freezing-point depressant and having much corrosion-preventing effect on the metal is desired.

The antifreeze which costs low and has a superior corrosion-preventing effect is disclosed in Japanese Laid Open Patent Application (JP-P-Heisei 8-85782). The propylene glycol type coolant which is not diluted with water is disclosed in International Publication (WO95/07323). The antifreeze whose corrosion-preventing effect is improved is disclosed in International Publication (WO01/002511). The antifreeze whose corrosion-preventing effect on aluminum is remarkably improved is disclosed in Japanese Laid Open Patent Application (JP-P-Heisei01-315481). The coolant composition which is especially effective for automobiles and so on which tends to include aluminum alloy in the engine coolant is disclosed in Japanese Laid Open Patent Application (JP-P-Heisei04-59885).

SUMMARY OF THE INVENTION

An object of the present invention is to provide antifreeze which has less environmental load, and also has much corrosion-preventing effect on the metal.

Preferably, the antifreeze in this invention includes propylene glycol, first material, and second material. The first material is selected from the group consisting of the normal aliphatic dicarboxylic acid in which the number of carbon atom is from 10 to 12, the salt of the normal aliphatic dicarboxylic acid, and the mixture of the normal aliphatic dicarboxylic acid and the salt of the normal aliphatic dicarboxylic acid. The second material is selected from the group consisting of the benzimidazole compound which has the benzimidazole skeleton, the salt of the benzimidazole compound, the triazine compound which has the triazine skeleton and has the mercapto group, the salt of the triazine compound, and the mixture of plurality of materials selected from the group consisting of the benzimidazole compound, the salt of benzimidazole compound, the triazine compound, and the salt of the triazine compound. Such antifreeze has less environmental load than the one including ethylene glycol, and furthermore has much corrosion-preventing effect on the metal.

Preferably, the benzimidazole compound is represented by the formula 1:

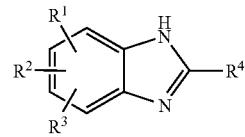

wherein the first group $R^1$ is selected from the group consisting of the hydrogen atom, the hydroxyl group, the carboxyl group, and the substituent. The second group $R^2$ is selected from the group consisting of the hydrogen atom, the hydroxyl group, the carboxyl group, and the substituent. The third group $R^3$ is selected from the group consisting of the hydrogen atom, the hydroxyl group, the carboxyl group, and the substituent. The forth group $R^4$ is selected from the group consisting of the hydrogen atom, the hydrocarbon group, the group including sulfur, the group including nitrogen, and the group including sulfur and nitrogen.

The substituent is the group selected from the group consisting of the hydrocarbon group, the group which is represented by substituting at least one hydrogen atom in the hydrocarbon group for the hydroxyl group, the group which is represented by substituting at least one hydrogen atom in the hydrocarbon group for the carboxyl group, the group which is represented by substituting one hydrogen atom in the hydrocarbon group for the hydroxyl group and the other hydrogen atom for the carboxyl group. The first group $R^1$, the second group $R^2$, and the third group $R^3$ may be either same or different each other.

Preferably, the triazine compound is represented by the formula 2:

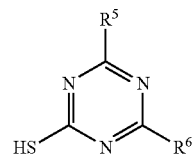

wherein the fifth group $R^5$ is selected from the group consisting of the hydrogen atom, the hydrocarbon group, the group including sulfur, the group including nitrogen, the group including nitrogen and sulfur. The sixth group $R^6$ is selected from the group consisting of the hydrogen atom, the hydrocarbon group, the group including sulfur, the group including nitrogen, the group including nitrogen and sulfur. The fifth group $R^5$ and the sixth group $R^6$ may be either same or different each other.

The benzimidazole compound is preferably thiabendazole, and the triazine compound is preferably trimercapto-s-triazine.

Preferably, the amount of the first material ranges 0.1 to 5.0 parts by weight par 100 parts by weight of propylene glycol. The amount of the second material preferably ranges 0.01 to 2.0 parts by weight par 100 parts by weight of propylene glycol.

The antifreeze of the present invention preferably includes the third material. The third material is selected from the group consisting of the aromatic carboxylic acid and the salt of the aromatic carboxylic acid. The aromatic carboxylic acid is represented by the formula 3:

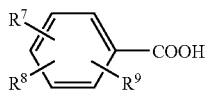

wherein the seventh group $R^7$ is selected from the group consisting of the hydrogen atom, the hydroxyl group, the amino group, and the hydrocarbon group in which the number of carbon atom is 1 to 6. The eighth group $R^8$ is selected from the group consisting of the hydrogen atom, the hydroxyl group, the amino group, and the hydrocarbon group in which the number of carbon atom is 1 to 6. The ninth group $R^9$ is selected from the group consisting of the hydrogen atom, the hydroxyl group, the amino group, and the hydrocarbon group in which the number of carbon atom is 1 to 6. The seventh group $R^7$, the eighth group $R^8$, and the ninth group $R^9$ may be either same or different each other.

Preferably, the amount of the third material ranges 0.02 to 4.0 parts by weight par 100 parts by weight of propylene glycol.

The antifreeze of the present invention preferably includes the forth material selected from the group consisting of the nitric acid, the salt of the nitric acid, and the mixture of the nitric acid and the salt of nitric acid.

Preferably, the amount of the forth material ranges 0.02 to 1.0 parts by weight par 100 parts by weight of propylene glycol.

The antifreeze of the present invention includes water. In this case, the pH value is preferably ranges 7.0 to 9.0.

Preferably, the concentration of propylene glycol ranges 25 to 65% by weight.

Preferably, the value X ranges 0.06 to 1.2, more preferably 0.08 to 0.9. The value X is represented by the formula:

$$X=T+3S.$$

The value T is the weight of the benzimidazole compound and the salt of the benzimidazole compound per 100 weight of propylene glycol.

The value S is the weight of the triazine compound and the salt of the triazine compound per 100 weight of propylene glycol.

EFFECT OF THE INVENTION

The antifreeze of the present invention has less environmental load, and has better corrosion-preventing effect on the metal.

BRIEF DESCRIPTION OF THE DRAWINGS

FIG. 1 is a table showing the composition of comparative example 1 to 5 and results of corrosive behavior tests;

FIG. 2 is a table showing the composition of embodiments 1 to 9 and results of corrosive behavior tests;

FIG. 3 is a table showing the composition of embodiments 10 to 19 and results of corrosive behavior tests;

FIG. 4 is a table showing the composition of embodiments 20 to 29 and results of corrosive behavior tests;

FIG. 5 is a table showing the composition of embodiments 30 to 35 and results of corrosive behavior tests;

FIG. 6 is a table showing the composition of embodiments 36 to 42 and results of corrosive behavior tests; and FIG. 7 is a table showing the composition of embodiments 43 to 50 and results of corrosive behavior tests.

DESCRIPTION OF THE PREFERRED EMBODIMENTS

Embodiments of the antifreeze of the present invention will be described below.

The antifreeze includes propylene glycol, the first material, the second material, the third material, the forth material, and water. The essential component of the antifreeze is propylene glycol, the first material, and the second material. The third material, the forth material, and water may be not added.

Propylene glycol(1,2-propane-diol) is the main component of the antifreeze of the present invention. Propylene glycol is added as freezing-point depressant. Propylene glycol is the material which has less environmental load, and is also used as a food additives. Propylene glycol made by any manufacturing method can be added. For example, a propylene glycol available in markets may be added.

The antifreeze does not show sufficient anti-freeze-effect when the concentration of propylene glycol is extremely low. The minimum concentration of propylene glycol depends on the temperature in which the antifreeze is used. Accordingly, the minimum concentration is selected properly. The concentration of propylene glycol at the present invention is preferably more than 25% by weight.

The first material is the normal aliphatic dicarboxylic acid in which the number of carbon atoms is 10 to 12 or the salt of such normal aliphatic dicarboxylic acid. The first material is added for increasing the corrosion-preventing effect on the metal. For example, the normal aliphatic dicarboxylic acid is sebacic acid, undecandioic acid, or dodecandioic acid. For example, the salt of the normal aliphatic dicarboxylic acid is the alkali metal salt, the ammonium salt, or the organic ammonium salt. For example, the alkali metal is lithium, sodium, or potassium. For example, the organic ammonium salt is the alkylammonium salt or the alkanolammonium salt. The salt of normal aliphatic dicarboxylic acid may be either the acid salt of the normal aliphatic dicarboxylic acid in which one hydrogen atom of two carboxyl group is not substituted or the salt of dicarboxylic acid in which two carboxyl group links two different kind cation with ionic bond.

The first material may be either one material selected from the plurality of materials described as the first material or the mixture of the plurality of materials selected from the plurality of materials described as the first material. The first material may include more than three cation when it is the mixture.

Further, the antifreeze of the present invention preferably includes 0.1 to 5.0 parts by weight of the first material par 100 parts by weight of propylene glycol, because sufficient corrosion-preventing effect is obtained and turbidity or deposition is inhibited. The amount of the first material is more preferably 0.3 to 3.0 parts by weight par 100 parts by weight of propylene glycol.

The second material is the benzimidazole compound, the benzimidazole compound salt, the triazine compound, the triazine compound salt, or the mixture of at least two materials selected from the group consisting of the benzimidazole compound, the salt of the benzimidazole compound, the triazine compound, or the salt of the triazine compound. The second material is added for increasing the corrosion-preventing effect on the metal.

The benzimidazole compound is a compound which has the benzimidazole skeleton. The benzimidazole compound is represented by formula 4:

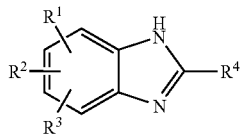

Such benzimidazole compound is preferable from the aspect of decreasing the environmental load and increasing the corrosion-preventing effect.

The first group $R^1$ is the hydrogen atom, the hydroxyl group, the carboxyl group, or the hydrocarbon group. For example, the hydrocarbon group is the normal or branched alkyl group, the alkenyl group, the cycloalkyl group, the cycloalkenyl group, or the aryl group. Preferably, the number of carbon atom in the hydrocarbon group is 1 to 20, more preferably 1 to 8. The hydrogen atom of the hydrocarbon group may be substituted by the carboxyl group or the hydroxyl group. That means the first group $R^1$ may be the hydrocarbon group in which part of hydrogen atom is substituted by the hydroxyl group, the hydrocarbon group in which part of the hydrogen atom is substituted by the carboxyl group, or the hydrocarbon group in which part of the hydrogen atom is substituted by the hydroxyl group and the other hydrogen atom is substituted by the carboxyl group.

The second group $R^2$ is designed like the first group $R^1$. The second group $R^2$ is the hydrogen atom, the hydroxyl group, the carboxyl group, or the hydrocarbon group. For example, the hydrocarbon group is the normal or branched alkyl group, the alkenyl group, the cycloalkyl group, the cycloalkenyl group, or the aryl group. Preferably, the number of carbon atoms in the hydrocarbon group is 1 to 20, more preferably 1 to 8. The hydrogen atom of the hydrocarbon group may be substituted by the carboxyl group or the hydroxyl group. That means the second group $R^2$ may be the hydrocarbon group in which part of hydrogen atom is substituted by the hydroxyl group, the hydrocarbon group in which part of the hydrogen atom is substituted by the carboxyl group, or the hydrocarbon group in which one hydrogen atom is substituted by the hydroxyl group and the other hydrogen atom is substituted by the carboxyl group.

The third group $R^3$ is designed like the first group $R^1$. The third group $R^3$ is the hydrogen atom, the hydroxyl group, the carboxyl group, or the hydrocarbon group. For example, the hydrocarbon group is the normal or branched alkyl group, the alkenyl group, the cycloalkyl group, the cycloalkenyl group, and the aryl group. Preferably, the number of carbon atoms in the hydrocarbon group is 1 to 20, more preferably 1 to 8. The hydrogen atom of the hydrocarbon group may be substituted by the carboxyl group or the hydroxyl group. That means the third group $R^3$ may be the hydrocarbon group in which part of hydrogen atom is substituted by the hydroxyl group, the hydrocarbon group in which part of the hydrogen atom is substituted by the carboxyl group, or the hydrocarbon group in which one hydrogen atom is substituted by the hydroxyl group and the other hydrogen atom is substituted by the carboxyl group.

The first group $R^1$, the second group $R^2$, and the third group $R^1$ may be either same or different each other.

The forth group $R^4$ is hydrogen atom, the hydrocarbon group, the group including sulfur, the group including nitrogen, or the group including sulfur and nitrogen. For example, the hydrocarbon group is the normal or branched alkyl group, the alkenyl group, the cycloalkyl group, the cycloalkenyl group, or the aryl group. Preferably, the number of carbon atoms in the hydrocarbon group is 1 to 20, more preferably 1 to 8. For example, the group including sulfur is the group represented by next formula:

The tenth group $R^{10}$ is the hydrogen atom, or the normal, branched, or cyclic alkyl group. For example, the group including nitrogen is the group represented by next formula:

The eleventh group $R^{11}$ is the hydrogen atom or the hydrocarbon group. For example, the hydrocarbon group is the normal or branched alkyl group, the alkenyl group, the cycloalkyl group, the cycloalkenyl group, or the aryl group. The twelfth group $R^{12}$ is the hydrogen atom or the hydrocarbon group. For example, the hydrocarbon group is the normal or branched alkyl group, the alkenyl group, the cycloalkyl group, the cycloalkenyl group, or the aryl group. The eleventh group $R^{11}$ and the twelfth group $R^{12}$ may be either same or different each other.

For example, the group including sulfur and nitrogen is the group represented by next formula:

or the group including five-membered or six-membered heterocyclic group which has sulfur and nitrogen in the ring. The 13th group $R^{13}$ is a heterocycle part including nitrogen. The number of carbon atom in the 13th group $R^{13}$ is 3 to 6. The 13the group $R^{13}$ may include oxygen or nitrogen in the main chain. For example, the group represented by next formula;

is the group represented by next formula 5:

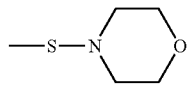

or the group represented by next formula 6.

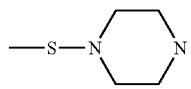

Preferably, the forth group $R^4$ is the hydrogen atom, the methyl group, the ethyl group, the mercapto group, the dibutylamino group, the phenylamino group, the thiazolyl group, the group represented by the formula 5, or the group represented by the formula 6.

In particular, thiabendazole is preferable as the benzimidazole compound. Thiabendazole is the compound described in CAS No. 148-79-8.

The benzimidazole compound salt is the salt of the benzimidazole compound described already. For example, the salt is the alkali metal salt, the alkali earth metal salt, the ammonium salt, or the organic ammonium salt. For example, the alkali metal is lithium, sodium, or potassium. For example, the organic ammonium salt is an alkylammonium salt or an alkanolammonium salt. The benzimidazole compound salt is preferably the alkali metal salt of the benzimidazole compound, in particular sodium salt or potassium salt is preferable.

The triazine compound is including the mercapto group. For example, the triazine compound is the compound represented by the formula 7.

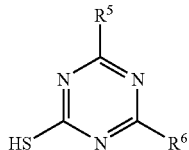

Such triazine compound is preferable in aspect of decreasing the environmental load and increasing the corrosion-preventing effect. The fifth group $R^5$ is designed like the forth group $R^4$. That means, the fifth group $R^5$ is hydrogen atom, the hydrocarbon group, the group including sulfur, the group including nitrogen, or the group including sulfur and nitrogen. For example, the hydrocarbon group is the normal or branched alkyl group, the alkenyl group, the cycloalkyl group, the cycloalkenyl group, or the aryl group. Preferably, the number of carbon atoms in the hydrocarbon group is 1 to 20, more preferably 1 to 8. The group which includes sulfur or nitrogen is normal, branched, or cyclic group. For example, the group including sulfur is the group represented by next formula:

wherein the tenth group $R^{10}$ is hydrogen atom, or normal, branched, or cyclic alkyl group. For example, the group including nitrogen is the group represented by next formula:

wherein the eleventh group $R^{11}$ is the hydrogen atom or the hydrocarbon group. For example, the hydrocarbon group is the normal or branched alkyl group, the alkenyl group, the cycloalkyl group, the cycloalkenyl group, or the aryl group. The twelfth group $R^{12}$ is the hydrogen atom or the hydrocarbon group. For example, the hydrocarbon group is the normal or branched alkyl group, the alkenyl group, the cycloalkyl group, the cycloalkenyl group, or the aryl group. The eleventh group $R^{11}$ and the twelfth group $R^{12}$ may be either same or different each other.

For example, the group including sulfur and nitrogen is the group represented by the next formula:

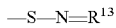

or the group including five-membered or six-membered heterocyclic group which has sulfur and nitrogen in the ring. The 13th group $R^{13}$ is a heterocycle part including nitrogen. The number of carbon atom in the 13th group $R^{13}$ is 3 to 6. The 13the group $R^{13}$ may include oxygen or nitrogen in the main chain.

The hydrogen atom, the methyl group, the ethyl group, the mercapto group, the dibutylamino group, the phenylamino group, the thiazolyl group, the group represented by formula 8;

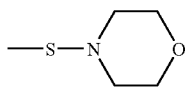

or the group represented by the formula 9;

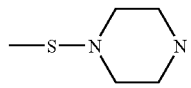

is more preferable as the fifth group $R^5$.

The sixth group $R^6$ is designed like the fifth group $R^5$. That means, the sixth group $R^6$ is hydrogen atom, the hydrocarbon group, the group including sulfur, the group including nitrogen, or the group including sulfur and nitrogen. For example, the hydrocarbon group is the normal or branched alkyl group, the alkenyl group, the cycloalkyl group, the cycloalkenyl group, or the aryl group. Preferably, the number of carbon atoms in the hydrocarbon group is 1 to 20, more preferably 1 to 8. For example, the group including sulfur is the group represented by next formula:

The tenth group $R^{10}$ is hydrogen atom, or normal, branched, or cyclic alkyl group. For example, the group including nitrogen is the group represented by next formula:

The eleventh group $R^{11}$ is hydrogen atom or hydrocarbon group. For example, the hydrocarbon group is the normal or branched alkyl group, the alkenyl group, the cycloalkyl group, the cycloalkenyl group, or the aryl group. The twelfth group $R^{12}$ is the hydrogen atom or the hydrocarbon group. For example, the hydrocarbon group is the normal or branched alkyl group, the alkenyl group, the cycloalkyl group, the cycloalkenyl group, or the aryl group. The eleventh group $R^{11}$ and the twelfth group $R^{12}$ may be either same or different each other.

For example, the group including sulfur and nitrogen is the group represented by next formula:

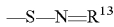

or the group including five-membered or six-membered heterocyclic group which has sulfur and nitrogen in the ring. The 13th group $R^{13}$ is a heterocycle part including nitrogen. The number of carbon atom in the 13th group $R^{13}$ is 3 to 6. The 13th group $R^{13}$ may include oxygen or nitrogen in the main chain.

The hydrogen atom, the methyl group, the ethyl group, the mercapto group, the dibutylamino group, the phenylamino group, the thiazolyl group, the group represented by formula 8, or the group represented by formula 9 is more preferable as the sixth group $R^6$.

Dimercapto-s-triazine or trimercapto-s-triazine is particularly preferable as the triazine compound. Trimercapto-s-triazine is the compound represented by CAS No. 638-16-4.

The triazine compound salt is the salt of the triazine compound described already. For example, the triazine compound salt is an alkali metal salt, the alkali earth metal salt, the ammonium salt, or the organic ammonium salt. For example, the alkali metal is lithium, sodium, or potassium. For example, the organic ammonium salt is the alkyl ammonium salt or the alkanol ammonium salt. In particular, the triazine compound salt is preferably the alkali metal salt of the triazine compound, in particular the sodium or potassium salt.

The second material may be either one material selected from plurality of materials described as the second material or the mixture of the plurality of materials selected from the plurality of materials exemplified as the second material. The second material may include at least three cation when it is the mixture.

Furthermore, in the aspect of obtaining the sufficient corrosion-preventing effect, the antifreeze of the present invention is preferably including 0.01 to 5.0 parts by weight of the second material par 100 parts by weight of propylene glycol. We define value-X represented by next formula:

$$X=T+3S;$$

wherein value-T is the mass of the benzimidazole compound and the benzimidazole compound salt par 100 mass of propylene glycol. Value-S is the mass of the triazine compound and the triazine compound salt par 100 mass of propylene glycol. The value-X of the antifreeze of the present invention ranges preferably from 0.06 to 1.2, more preferably 0.08 to 0.9. Either the value-S or the value-T may be zero.

The third material is the aromatic carboxylic acid, the salt of the aromatic carboxylic acid, or the mixture thereof. The third material is added so as to increase the corrosion-preventing effect on the metal. The aromatic carboxyl acid is represented by the formula 10;

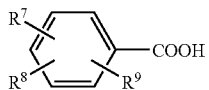

Wherein the seventh group $R^7$ is the hydrogen atom, the hydroxyl group, the amino group, or the hydrocarbon group in which the number of carbon atoms is 1 to 6. The 8th group $R^8$ is the hydrogen atom, the hydroxyl group, the amino group, or the hydrocarbon group in which the number of carbon atoms is 1 to 6. The 9th group $R^9$ is the hydrogen atom, the hydroxyl group, the amino group, or the hydrocarbon group in which the number of carbon atoms is 1 to 6. The 7th group $R^1$, 8th group $R^8$, 9th group $R^9$ may be either same or different each other.

For example, the aromatic carboxylic acid is benzoic acid, toluic acid, p-tert-butyl benzoic acid, p-hydroxybenzoic acid, 3,4,5-trihydroxybenzoic acid, p-amino benzoic acid, or anthranilic acid. In the aspect of increasing the corrosion-preventing effect and decreasing environmental load, the aromatic carboxylic acid is preferably the p-tert-butyl benzoic acid, the p-hydroxybenzoic acid, the 3,4,5-trihydroxybenzoic acid, the p-aminobenzoic acid, or the anthranilic acid. Especially, the aromatic carboxylic acid is preferably the p-hydroxybenzoic acid or the p-aminobenzoic acid.

As the salt of the aromatic carboxylic acid, the salt which is soluble in the antifreeze of the present invention is used. For example, the salt of the aromatic carboxylic acid is the alkaline metal salt, the ammonium salt, or the organic ammonium salt. For example, the alkaline metal salt is the lithium salt, the sodium salt, or the potassium salt. For example, the organic ammonium salt is the alkylammonium salt or the alkanolammonium salt.

The third material may be either one material selected from the plurality of materials described as the third material or the mixture of the plurality of materials selected from the plurality of materials described as the third material. The third material may include more than three cation when being the mixture.

Furthermore, from the viewpoint of increasing the corrosion-preventing effect, the antifreeze of the present invention is preferably including 0.02 to 4.0 parts by weight of the third material par 100 parts by weight of propylene glycol. The antifreeze of the present invention is more preferably including 0.07 to 2.0 parts by weight of the third material par 100 parts by weight of propylene glycol.

The forth material is the nitric acid or the nitric acid salt. The forth material is added for increasing the corrosion-preventing effect on the metal. As the nitric acid, the one made by any method of manufacturing process may be used. The nitric acid available in markets can be used. As the nitric acid salt, the salt which is soluble in the antifreeze of the present invention is used. For example, the nitric acid salt is the alkaline metal salt, the ammonium salt, or the organic ammonium salt. For example, the alkaline metal salt is the lithium salt, the sodium salt, or the potassium salt. For example, the organic ammonium salt is the alkylammonium salt or the alkanolammonium salt.

The forth material may be either one material selected from the plurality of materials described as the forth material or the mixture of the plurality of materials selected from the plurality of materials described as the forth material. The forth material may include more than three cation when being the mixture.

Furthermore, from the viewpoint of increasing the corrosion-preventing effect, the antifreeze of the present invention is preferably including 0.02 to 1.0 parts by weight of the forth material par 100 parts by weight of propylene glycol. The antifreeze of the present invention is more preferably including 0.07 to 0.8 parts by weight of the forth material par 100 parts by weight of propylene glycol.

Water is added for economical efficiency, that is for decreasing the price par weight. Water in which floating grains and the amount of dissolved ion is less is used as the water. For example, the water is the ion exchanged water. The antifreeze of the present invention can be used without water. When the antifreeze of the present invention is used after being diluted with water, a hydroxide may be further added. The hydroxide is added for adjusting pH of the antifreeze. For example, the hydroxide is the sodium hydroxide or the potassium hydroxide. In the viewpoint of absolutely obtaining the corrosion-preventing effect, pH of the antifreeze is preferably 7.0 to 9.0, more preferably 7.4 to 8.4.

When the antifreeze of the present invention is used after being diluted with water, the concentration of propylene glycol is preferably less than 65% by weight from the aspect of economical efficiency.

The manufacturing method of the antifreeze of the present invention comprises a step of fabricating a first intermediate product, a step of fabricating a second intermediate product, and a step of fabricating antifreeze. First material, second material, third material, and forth material are added in propylene glycol at the step of fabricating the first intermediate product. At the step of fabricating the first intermediate product, the hydroxide may be added in propylene glycol. In addition, water may be added into propylene glycol, providing that the concentration of propylene glycol will not be less than 25% by weight. At the step of fabricating the second intermediate product, the hydroxide is added in the first intermediate product so that pH becomes 7.0 to 9.0. At the step of fabricating the antifreeze, ion exchange water is added. In this step, the concentration of propylene glycol becomes between 25% and 65% by weight.

The corrosion-preventing effect on the metal can be evaluated by corrosion behavior test on the metal which is specified in Japanese Industrial Standard K2234. At the test, the plurality of test pieces connected to the dissimilar metals have been soaked in the 88±2 degrees of antifreeze for 336 hours, then the change of mass can be estimated. The plurality of test pieces is made of aluminum casting, cast iron, steel, solder, and copper. The corrosion-preventing effect of the antifreeze is evaluated higher when the numerical value of the mass change is smaller.

The embodiments of the antifreeze of the present invention are described with reference to drawings. FIG. 1 shows the compositions and the results of the corrosion behavior test of comparative examples 1 to 5. Sample 1 described in FIG. 1 to 7 is propylene glycol. Sample 2 is sebacic acid. Sample 3 is undecandioic acid. Sample 4 is dodecandioic acid. Sample 5 is trimercapto-s-triazine. Sample 6 is thiabendazole. Sample 7 is p-hydroxybenzoic acid. Sample 8 is p-aminobenzoic acid. Sample 9 is p-tert-butylbenzoic acid. Sample 10 is toluic acid. Sample 11 is 60% nitric acid. Sample 12 is potassium hydroxide. Sample 13 is ion exchange water. Sample 14 is sodium sebacate. Sample 15 is potassium sebacate. Sample 16 is ammonium sebacate. Sample 17 is undecandioic acid sodium salt. Sample 18 is dodecandioic acid sodium salt. Sample 19 is p-hydroxybenzoic acid sodium salt. Sample 20 is p-hydroxybenzoic acid potassium salt. Sample 21 is p-hydroxybenzoic acid ammonium salt. Sample 22 is p-aminobenzoic acid sodium salt. Sample 23 is p-tert-butylbenzoic acid sodium salt. Sample 24 is toluic acid sodium salt. Sample 25 is sodium nitrate. Sample 26 is potassium nitrate. Sample 27 is ammonium nitrate.

At the antifreeze shown in the comparative example 1, the sample 12 is added in propylene glycol so that pH will be 7.8, and the sample 13 is added so that the concentration of the sample 1 will be 30% by weight.

At the antifreeze shown in the comparative example 1, according to the test of corrosive behavior of metals, the change of the aluminum casting mass is $-1.66$ mg/cm$^2$, and the change of the cast iron mass is $-3.12$ mg/cm$^2$, and the change of the steel mass is $-9.94$ mg/cm$^2$, and the change of the brass mass is $-0.09$ mg/cm$^2$, and the change of the solder mass is $-0.96$ mg/cm$^2$, and the change of the copper mass is $-0.09$ mg/cm$^2$.

The antifreeze shown in the comparative example 2 includes 0.1 parts by weight of the sample 5 par 100 parts by weight of propylene glycol. Furthermore, the sample 12 is added so that pH will be 7.8. The sample 13 is added so that the concentration of the sample 1 will be 30% by weight.

At the antifreeze shown in the comparative example 2, according to the test of corrosive behavior of metals, the change of the aluminum casting mass is $-0.64$ mg/cm$^2$, and the change of the cast iron mass is $-0.68$ mg/cm$^2$, and the change of the steel mass is $-1.74$ mg/cm$^2$, and the change of the brass mass is $-0.07$ mg/cm$^2$, and the change of the solder mass is $-0.48$ mg/cm$^2$, and the change of the copper mass is $-0.05$ mg/cm$^2$.

The antifreeze shown in the comparative example 3 includes 1.2 parts by weight of the sample 2 par 100 parts by weight of propylene glycol. Furthermore, the sample 12 is added so that pH will be 7.8. The sample 13 is added so that the concentration of the sample 1 will be 30% by weight.

At the antifreeze shown in the comparative example 3, according to the test of corrosive behavior of metals, the change of the aluminum casting mass is $-1.23$ mg/cm$^2$, and the change of the cast iron mass is $-0.52$ mg/cm$^2$, and the change of the steel mass is $-0.31$ mg/cm$^2$, and the change of the brass mass is $-0.10$ mg/cm$^2$, and the change of the solder mass is $-0.33$ mg/cm$^2$, and the change of the copper mass is $-0.11$ mg/cm$^2$.

The antifreeze shown in the comparative example 4 includes 0.1 parts by weight of the sample 5 par 100 parts by weight of propylene glycol. The antifreeze shown in the comparative example 4 includes 1.0 parts by weight of the sample 7 par 100 parts by weight of propylene glycol. The antifreeze shown in the comparative example 4 includes 0.5 parts by weight of the sample 11 par 100 parts by weight of propylene glycol. Furthermore, the sample 12 is added so that pH will be 7.8. The sample 13 is added so that the concentration of the sample 1 will be 30% by weight.

At the antifreeze shown in the comparative example 4, according to the test of corrosive behavior of metals, the change of the aluminum casting mass is $-0.55$ mg/cm$^2$, and the change of the cast iron mass is $-0.61$ mg/cm$^2$, and the change of the steel mass is $-0.42$ mg/cm$^2$, and the change of the brass mass is $+0.05$ mg/cm$^2$, and the change of the solder mass is $-0.53$ mg/cm$^2$, and the change of the copper mass is $+0.03$ mg/cm$^2$.

The antifreeze shown in the comparative example 5 includes 1.2 parts by weight of the sample 2 par 100 parts by weight of propylene glycol. The antifreeze shown in the comparative example 5 includes 1.0 parts by weight of the sample 7 par 100 parts by weight of propylene glycol. The antifreeze shown in the comparative example 5 includes 0.5 parts by weight of the sample 11 par 100 parts by weight of propylene glycol. Furthermore, the sample 12 is added so that pH will be 7.8. The sample 13 is added so that the concentration of sample 1 will be 30% by weight.

At the antifreeze shown in the comparative example 5, according to the test of corrosive behavior of metals, the change of the aluminum casting mass is $-0.77$ mg/cm$^2$, and the change of the cast iron mass is $-0.36$ mg/cm$^2$, and the change of the steel mass is $-0.25$ mg/cm$^2$, and the change of the brass mass is $+0.05$ mg/cm$^2$, and the change of the solder mass is $-0.15$ mg/cm$^2$, and the change of the copper mass is $-0.08$ mg/cm$^2$.

Embodiment 1

FIG. 2 shows the composition of embodiments 1 to 9 and the results of corrosion behavior test on metals. The antifreeze shown in embodiment 1 includes 0.2 parts by weight of the sample 2 par 100 parts by weight of propylene glycol.

The antifreeze shown in the embodiment 1 includes 0.1 parts by weight of the sample 5 par 100 parts by weight of propylene glycol. Furthermore, the sample 12 is added so that pH will be 7.8. The sample 13 is added so that the concentration of the sample 1 will be 30% by weight.

At the antifreeze shown in embodiment 1, according to the test of corrosive behavior of metals, the change of the aluminum casting mass is $-0.29$ mg/cm$^2$, and the change of the cast iron mass is $-0.15$ mg/cm$^2$, and the change of the steel mass is $-0.09$ mg/cm$^2$, and the change of the brass mass is $-0.03$ mg/cm$^2$, and the change of the solder mass is $-0.27$ mg/cm$^2$, and the change of the copper mass is $-0.06$ mg/cm$^2$. In other words, the test results show the antifreeze of embodiment 1 has higher corrosion inhibition effect on metals than the antifreeze of comparative examples 1 to 5.

Embodiment 2

The antifreeze shown in the embodiment 2 includes 0.5 parts by weight of the sample 2 par 100 parts by weight of propylene glycol.

The antifreeze shown in embodiment 2 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 2, according to the test of corrosive behavior of metals, the change of the aluminum casting mass is $-0.27$ mg/cm$^2$, and the change of the cast iron mass is $-0.14$ mg/cm$^2$, and the change of the steel mass is $-0.07$ mg/cm$^2$, and the change of the brass mass is $-0.04$ mg/cm$^2$, and the change of the solder mass is $-0.20$ mg/cm$^2$, and the change of the copper mass is $-0.06$ mg/cm$^2$. In other words, the test results show the antifreeze of the embodiment 2 has higher corrosion inhibition effect on metals than the antifreeze of comparative examples 1 to 5.

Embodiment 3

The antifreeze shown in the embodiment 3 includes 1.2 parts by weight of the sample 2 par 100 parts by weight of propylene glycol.

The antifreeze shown in the embodiment 3 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 3, according to the test of corrosive behavior of metals, the change of the aluminum casting mass is $-0.23$ mg/cm$^2$, and the change of the cast iron mass is $-0.05$ mg/cm$^2$, and the change of the steel mass is $-0.02$ mg/cm$^2$, and the change of the brass mass is $-0.04$ mg/cm$^2$, and the change of the solder mass is $-0.15$ mg/cm$^2$, and the change of the copper mass is $-0.05$ mg/cm$^2$. In other words, the test results show the antifreeze of embodiment 3 has higher corrosion inhibition effect on metals than the antifreeze of comparative examples 1 to 5.

Embodiment 4

The antifreeze shown in the embodiment 4 includes 2.0 parts by weight of the sample 2 par 100 parts by weight of propylene glycol.

The antifreeze shown in the embodiment 4 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in embodiment 4, according to the test of corrosive behavior of metals, the change of the aluminum casting mass is $-0.25$ mg/cm$^2$, and the change of the cast iron mass is $-0.05$ mg/cm$^2$, and the change of the steel mass is $-0.02$ mg/cm$^2$, and the change of the brass mass is $-0.03$ mg/cm$^2$, and the change of the solder mass is $-0.17$ mg/cm$^2$, and the change of the copper mass is $-0.05$ mg/cm$^2$. In other words, the test results show the antifreeze of embodiment 4 has higher corrosion inhibition effect on metals than the antifreeze of comparative examples 1 to 5.

Embodiment 5

The antifreeze shown in the embodiment 5 includes 4.0 parts by weight of the sample 2 par 100 parts by weight of propylene glycol.

The antifreeze shown in the embodiment 5 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 5, according to the test of corrosive behavior of metals, the change of the aluminum casting mass is $-0.20$ mg/cm$^2$, and the change of the cast iron mass is $-0.04$ mg/cm$^2$, and the change of the steel mass is $-0.02$ mg/cm$^2$, and the change of the brass mass is $-0.05$ mg/cm$^2$, and the change of the solder mass is $-0.17$ mg/cm$^2$, and the change of the copper mass is $-0.05$ mg/cm$^2$. In other words, the test results show the antifreeze of embodiment 5 has higher corrosion inhibition effect on metals than the antifreeze of comparative examples 1 to 5.

Embodiment 6

The antifreeze shown in the embodiment 6 includes 1.2 parts by weight of the sample 2 par 100 parts by weight of propylene glycol.

The antifreeze shown in the embodiment 6 includes 0.023 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 6, according to the test of corrosive behavior of metals, the change of the aluminum casting mass is $-0.28$ mg/cm$^2$, and the change of the cast iron mass is $-0.10$ mg/cm$^2$, and the change of the steel mass is $-0.05$ mg/cm$^2$, and the change of the brass mass is $-0.09$ mg/cm$^2$, and the change of the solder mass is $-0.27$ mg/cm$^2$, and the change of the copper mass is $-0.13$ mg/cm$^2$. In other words, the test results show the antifreeze of embodiment 6 has higher corrosion inhibition effect on metals than the antifreeze of comparative examples 1 to 5.

Embodiment 7

The antifreeze shown in the embodiment 7 includes 1.2 parts by weight of the sample 2 par 100 parts by weight of propylene glycol.

The antifreeze shown in the embodiment 7 includes 0.05 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 7, according to the test of corrosive behavior of metals, the change of the aluminum casting mass is $-0.25$ mg/cm$^2$, and the change of the cast iron mass is $-0.08$ mg/cm$^2$, and the change of the steel mass is $-0.03$ mg/cm$^2$, and the change of the brass mass is $-0.07$ mg/cm$^2$, and the change of the solder mass is $-0.24$ mg/cm$^2$, and the change of the copper mass is $-0.12$ mg/cm$^2$. In other words, the test results show the antifreeze of embodiment 7 has higher corrosion inhibition effect on metals than the antifreeze of comparative examples 1 to 5.

Embodiment 8

The antifreeze shown in the embodiment 8 includes 1.2 parts by weight of the sample 2 par 100 parts by weight of propylene glycol.

The antifreeze shown in the embodiment 8 includes 0.2 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 8, according to the test of corrosive behavior of metals, the change of the aluminum casting mass is $-0.22$ mg/cm$^2$, and the change of the cast iron mass is $-0.08$ mg/cm$^2$, and the change of the steel mass is $-0.03$ mg/cm$^2$, and the change of the brass mass is $-0.05$ mg/cm$^2$, and the change of the solder mass is $-0.16$ mg/cm$^2$, and the change of the copper mass is $-0.08$ mg/cm$^2$. In other words, the test results show the antifreeze of the embodiment 8 has higher corrosion inhibition effect on metals than the antifreeze of comparative examples 1 to 5.

Embodiment 9

The antifreeze shown in the embodiment 9 includes 1.2 parts by weight of the sample 2 par 100 parts by weight of propylene glycol.

The antifreeze shown in the embodiment 9 includes 0.35 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 9, according to the test of corrosive behavior of metals, the change of the aluminum casting mass is $-0.18$ mg/cm$^2$, and the change of the cast iron mass is $-0.06$ mg/cm$^2$, and the change of the steel mass is $-0.02$ mg/cm$^2$, and the change of the brass mass is $-0.02$ mg/cm$^2$, and the change of the solder mass is $-0.16$ mg/cm$^2$, and the change of the copper mass is $-0.03$ mg/cm$^2$. In other words, the test results show the antifreeze of the embodiment 9 has higher corrosion inhibition effect on metals than the antifreeze of comparative examples 1 to 5.

Embodiment 10

FIG. 3 shows the composition of the embodiment 10 to 19 and the results of corrosion behavior test on metals. The antifreeze shown in the embodiment 10 includes 1.2 parts by weight of the sample 3 par 100 parts by weight of propylene glycol.

The antifreeze shown in the embodiment 10 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 10, according to the test of corrosive behavior of metals, the change of the aluminum casting mass is $-0.24$ mg/cm$^2$, and the change of the cast iron mass is $-0.06$ mg/cm$^2$, and the change of the steel mass is $-0.02$ mg/cm$^2$, and the change of the brass mass is $-0.05$ mg/cm$^2$, and the change of the solder mass is $-0.19$ mg/cm$^2$, and the change of the copper mass is $-0.07$ mg/cm$^2$. In other words, the test results show the antifreeze of the embodiment 10 has higher corrosion inhibition effect on metals than the antifreeze of comparative examples 1 to 5.

Embodiment 11

The antifreeze shown in the embodiment 11 includes 1.2 parts by weight of the sample 4 par 100 parts by weight of propylene glycol.

The antifreeze shown in the embodiment 11 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 11, according to the test of corrosive behavior of metals, the change of the aluminum casting mass is $-0.28$ mg/cm$^2$, and the change of the cast iron mass is $-0.08$ mg/cm$^2$, and the change of the steel mass is $-0.03$ mg/cm$^2$, and the change of the brass mass is $-0.04$ mg/cm$^2$, and the change of the solder mass is $-0.18$ mg/cm$^2$, and the change of the copper mass is $-0.09$ mg/cm$^2$. In other words, the test results show the antifreeze of embodiment 11 has higher corrosion inhibition effect on metals than the antifreeze of comparative examples 1 to 5.

Embodiment 12

The antifreeze shown in the embodiment 12 includes 0.6 parts by weight of the sample 2 par 100 parts by weight of propylene glycol. The antifreeze shown in the embodiment 12 includes 0.6 parts by weight of the sample 3 par 100 parts by weight of propylene glycol. The antifreeze shown in embodiment 12 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 12, according to the test of corrosive behavior of metals, the change of the aluminum casting mass is $-0.24$ mg/cm$^2$, and the change of the cast iron mass is $-0.07$ mg/cm$^2$, and the change of the steel mass is $-0.04$ mg/cm$^2$, and the change of the brass mass is $-0.04$ mg/cm$^2$, and the change of the solder mass is $-0.17$ mg/cm$^2$, and the change of the copper mass is $-0.05$ mg/cm$^2$. In other words, the test results show the antifreeze of the embodiment 12 has higher corrosion inhibition effect on metals than the antifreeze of comparative examples 1 to 5.

Embodiment 13

The antifreeze shown in the embodiment 13 includes 0.6 parts by weight of the sample 3 par 100 parts by weight of propylene glycol.

The antifreeze shown in the embodiment 13 includes 0.6 parts by weight of the sample 4 par 100 parts by weight of propylene glycol.

The antifreeze shown in embodiment 13 includes 0.1 parts by weight of the sample 5 par 100 parts by weight of propylene glycol.

Furthermore, the sample 12 is added so that pH will be 7.8. The sample 13 is added so that the concentration of sample 1 will be 30% by weight.

At the antifreeze shown in the embodiment 13, according to the test of corrosive behavior of metals, the change of the aluminum casting mass is $-0.26$ mg/cm$^2$, and the change of the cast iron mass is $-0.08$ mg/cm$^2$, and the change of the steel mass is $-0.04$ mg/cm$^2$, and the change of the brass mass is $-0.05$ mg/cm$^2$, and the change of the solder mass is $-0.18$ mg/cm$^2$, and the change of the copper mass is $-0.09$ mg/cm$^2$. In other words, the test results show the antifreeze of embodiment 13 has higher corrosion inhibition effect on metals than the antifreeze of comparative examples 1 to 5.

Embodiment 14

The antifreeze shown in the embodiment 14 includes 0.6 parts by weight of the sample 2 par 100 parts by weight of propylene glycol.

The antifreeze shown in the embodiment 14 includes 0.6 parts by weight of the sample 4 par 100 parts by weight of propylene glycol.

The antifreeze shown in the embodiment 14 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 14, according to the test of corrosive behavior of metals, the change of the aluminum casting mass is $-0.25$ mg/cm$^2$, and the change of the cast iron mass is $-0.08$ mg/cm$^2$, and the change of the steel mass is −0.04 mg/cm², and the change of the brass mass is −0.04 mg/cm², and the change of the solder mass is −0.19 mg/cm², and the change of the copper mass is −0.08 mg/cm². In other words, the test results show the antifreeze of the embodiment 14 has higher corrosion inhibition effect on metals than the antifreeze of comparative examples 1 to 5.

Embodiment 15

The antifreeze shown in the embodiment 15 includes 0.4 parts by weight of the sample 2 par 100 parts by weight of propylene glycol.

The antifreeze shown in the embodiment 15 includes 0.4 parts by weight of the sample 3 par 100 parts by weight of propylene glycol.

The antifreeze shown in the embodiment 15 includes 0.4 parts by weight of the sample 4 par 100 parts by weight of propylene glycol.

The antifreeze shown in the embodiment 15 includes 0.1 parts by weight of the sample 5 par 100 parts by weight of propylene glycol.

Furthermore, the sample 12 is added so that pH will be 7.8. The sample 13 is added so that the concentration of sample 1 will be 30% by weight.

At the antifreeze shown in the embodiment 15, according to the test of corrosive behavior of metals, the change of the aluminum casting mass is −0.25 mg/cm², and the change of the cast iron mass is −0.08 mg/cm², and the change of the steel mass is −0.03 mg/cm², and the change of the brass mass is −0.04 mg/cm², and the change of the solder mass is −0.18 mg/cm², and the change of the copper mass is −0.09 mg/cm². In other words, the test results show the antifreeze of the embodiment 15 has higher corrosion inhibition effect on metals than the antifreeze of comparative-examples 1 to 5.

Embodiment 16

The antifreeze shown in the embodiment 16 includes 1.2 parts by weight of the sample 2 par 100 parts by weight of propylene glycol.

The antifreeze shown in the embodiment 16 includes 0.07 parts by weight of the sample 6 par 100 parts by weight of propylene glycol. Furthermore, the sample 12 is added so that pH will be 7.8. The sample 13 is added so that the concentration of sample 1 will be 30% by weight.

At the antifreeze shown in the embodiment 16, according to the test of corrosive behavior of metals, the change of the aluminum casting mass is −0.28 mg/cm², and the change of the cast iron mass is −0.12 mg/cm², and the change of the steel mass is −0.08 mg/cm², and the change of the brass mass is −0.12 mg/cm², and the change of the solder mass is −0.29 mg/cm², and the change of the copper mass is −0.15 mg/cm². In other words, the test results show the antifreeze of the embodiment 16 has higher corrosion inhibition effect on metals than the antifreeze of comparative examples 1 to 5.

Embodiment 17

The antifreeze shown in the embodiment 17 includes 1.2 parts by weight of the sample 2 par 100 parts by weight of propylene glycol.

The antifreeze shown in the embodiment 17 includes 0.5 parts by weight of the sample 6 par 100 parts by weight of propylene glycol. Furthermore, the sample 12 is added so that pH will be 7.8. The sample 13 is added so that the concentration of sample 1 will be 30% by weight.

At the antifreeze shown in the embodiment 17, according to the test of corrosive behavior of metals, the change of the aluminum casting mass is −0.28 mg/cm², and the change of the cast iron mass is −0.05 mg/cm², and the change of the steel mass is −0.05 mg/cm², and the change of the brass mass is −0.09 mg/cm², and the change of the solder mass is −0.27 mg/cm$^{-1}$, and the change of the copper mass is −0.12 mg/cm². In other words, the test results show the antifreeze of the embodiment 17 has higher corrosion inhibition effect on metals than the antifreeze of comparative examples 1 to 5.

Embodiment 18

The antifreeze shown in the embodiment 18 includes 1.2 parts by weight of the sample 2 par 100 parts by weight of propylene glycol.

The antifreeze shown in the embodiment 18 includes 1.0 parts by weight of the sample 6 par 100 parts by weight of propylene glycol. Furthermore, the sample 12 is added so that pH will be 7.8. The sample 13 is added so that the concentration of sample 1 will be 30% by weight.

At the antifreeze shown in the embodiment 18, according to the test of corrosive behavior of metals, the change of the aluminum casting mass is −0.21 mg/cm², and the change of the cast iron mass is −0.08 mg/cm², and the change of the steel mass is −0.03 mg/cm², and the change of the brass mass is −0.05 mg/cm², and the change of the solder mass is −0.15 mg/cm², and the change of the copper mass is −0.08 mg/cm². In other words, the test results show the antifreeze of the embodiment 18 has higher corrosion inhibition effect on metals than the antifreeze of comparative examples 1 to 5.

Embodiment 19

The antifreeze shown in the embodiment 19 includes 1.2 parts by weight of the sample 2 par 100 parts by weight of propylene glycol.

The antifreeze shown in the embodiment 19 includes 0.08 parts by weight of the sample 5 par 100 parts by weight of propylene glycol.

The antifreeze shown in the embodiment 19 includes 0.3 parts by weight of the sample 6 par 100 parts by weight of propylene glycol.

Furthermore, the sample 12 is added so that pH will be 7.8. The sample 13 is added so that the concentration of sample 1 will be 30% by weight.

At the antifreeze shown in the embodiment 19, according to the test of corrosive behavior of metals, the change of the aluminum casting mass is −0.19 mg/cm², and the change of the cast iron mass is −0.09 mg/cm², and the change of the steel mass is −0.03 mg/cm², and the change of the brass mass is −0.04 mg/cm², and the change of the solder mass is −0.14 mg/cm², and the change of the copper mass is −0.07 mg/cm². In other words, the test results show the antifreeze of the embodiment 19 has higher corrosion inhibition effect on metals than the antifreeze of comparative examples 1 to 5.

Embodiment 20

FIG. 4 shows the composition of the embodiments 20 to 29 and the results of corrosion behavior test on metals. The antifreeze shown in the embodiment 20 includes 1.2 parts by weight of the sample 2 par 100 parts by weight of propylene glycol. The antifreeze shown in the embodiment 20 includes 0.1 parts by weight of the sample 5 par 100 parts by weight of propylene glycol. The antifreeze shown in the embodiment 20 includes 0.05 parts by weight of the sample 7 par 100 parts by weight of propylene glycol. Furthermore, the sample 12 is added so that pH will be 7.8. The sample 13 is added so that the concentration of sample 1 will be 30% by weight.

At the antifreeze shown in the embodiment 20, according to the test of corrosive behavior of metals, the change of the aluminum casting mass is −0.19 mg/cm², and the change of the cast iron mass is −0.04 mg/cm², and the change of the steel mass is −0.01 mg/cm², and the change of the brass mass is −0.04 mg/cm², and the change of the solder mass is −0.15 mg/cm², and the change of the copper mass is −0.05 mg/cm². In other words, the test results show the antifreeze of the embodiment 20 has higher corrosion inhibition effect on metals than the antifreeze of comparative examples 1 to 5.

Embodiment 21

The antifreeze shown in the embodiment 21 includes 1.2 parts by weight of the sample 2 par 100 parts by weight of propylene glycol.

The antifreeze shown in the embodiment 21 includes 0.1 parts by weight of the sample 5 par 100 parts by weight of propylene glycol. The antifreeze shown in the embodiment 21 includes 1.0 parts by weight of the sample 7 par 100 parts by weight of propylene glycol. Furthermore, the sample 12 is added so that pH will be 7.8. The sample 13 is added so that the concentration of sample 1 will be 30% by weight.

At the antifreeze shown in the embodiment 21, according to the test of corrosive behavior of metals, the change of the aluminum casting mass is −0.10 mg/cm², and the change of the cast iron mass is −0.09 mg/cm², and the change of the steel mass is +0.02 mg/cm², and the change of the brass mass is −0.02 mg/cm², and the change of the solder mass is −0.12 mg/cm², and the change of the copper mass is −0.03 mg/cm². In other words, the test results show the antifreeze of the embodiment 21 has higher corrosion inhibition effect on metals than the antifreeze of comparative examples 1 to 5.

Embodiment 22

The antifreeze shown in the embodiment 22 includes 1.2 parts by weight of the sample 2 par 100 parts by weight of propylene glycol.

The antifreeze shown in the embodiment 22 includes 0.1 parts by weight of the sample 5 par 100 parts by weight of propylene glycol. The antifreeze shown in the embodiment 22 includes 3.0 parts by weight of the sample 7 par 100 parts by weight of propylene glycol. Furthermore, the sample 12 is added so that pH will be 7.8. The sample 13 is added so that the concentration of sample 1 will be 30% by weight.

At the antifreeze shown in the embodiment 22, according to the test of corrosive behavior of metals, the change of the aluminum casting mass is −0.15 mg/cm², and the change of the cast iron mass is −0.10 mg/cm², and the change of the steel mass is −0.03 mg/cm², and the change of the brass mass is −0.04 mg/cm², and the change of the solder mass is −0.14 mg/cm², and the change of the copper mass is −0.05 mg/cm². In other words, the test results show the antifreeze of the embodiment 22 has higher corrosion inhibition effect on metals than the antifreeze of comparative examples 1 to 5.

Embodiment 23

The antifreeze shown in the embodiment 23 includes 1.2 parts by weight of the sample 2 par 100 parts by weight of propylene glycol.

The antifreeze shown in the embodiment 23 includes 0.1 parts by weight of the sample 5 par 100 parts by weight of propylene glycol. The antifreeze shown in the embodiment 23 includes 1.0 parts by weight of the sample 8 par 100 parts by weight of propylene glycol. Furthermore, the sample 12 is added so that pH will be 7.8. The sample 13 is added so that the concentration of sample 1 will be 30% by weight.

At the antifreeze shown in the embodiment 23, according to the test of corrosive behavior of metals, the change of the aluminum casting mass is −0.07 mg/cm², and the change of the cast iron mass is −0.02 mg/cm², and the change of the steel mass is −0.01 mg/cm², and the change of the brass mass is −0.03 mg/cm², and the change of the solder mass is −0.11 mg/cm², and the change of the copper mass is −0.04 mg/cm². In other words, the test results show the antifreeze of the embodiment 23 has higher corrosion inhibition effect on metals than the antifreeze of comparative examples 1 to 5.

Embodiment 24

The antifreeze shown in the embodiment 24 includes 1.2 parts by weight of the sample 2 par 100 parts by weight of propylene glycol.

The antifreeze shown in the embodiment 24 includes 0.1 parts by weight of the sample 5 par 100 parts by weight of propylene glycol. The antifreeze shown in the embodiment 24 includes 1.0 parts by weight of the sample 9 par 100 parts by weight of propylene glycol. Furthermore, the sample 12 is added so that pH will be 7.8. The sample 13 is added so that the concentration of sample 1 will be 30% by weight.

At the antifreeze shown in the embodiment 21, according to the test of corrosive behavior of metals, the change of the aluminum casting mass is −0.09 mg/cm², and the change of the cast iron mass is −0.07 mg/cm², and the change of the steel mass is −0.02 mg/cm², and the change of the brass mass is −0.02 mg/cm², and the change of the solder mass is −0.10 mg/cm², and the change of the copper mass is −0.04 mg/cm². In other words, the test results show the antifreeze of the embodiment 24 has higher corrosion inhibition effect on metals than the antifreeze of comparative examples 1 to 5.

Embodiment 25

The antifreeze shown in the embodiment 25 includes 1.2 parts by weight of the sample 2 par 100 parts by weight of propylene glycol.

The antifreeze shown in the embodiment 25 includes 0.1 parts by weight of the sample 5 par 100 parts by weight of propylene glycol. The antifreeze shown in the embodiment 25 includes 1.0 parts by weight of the sample 10 par 100 parts by weight of propylene glycol. Furthermore, the sample 12 is added so that pH will be 7.8. The sample 13 is added so that the concentration of sample 1 will be 30% by weight.

At the antifreeze shown in the embodiment 25, according to the test of corrosive behavior of metals, the change of the aluminum casting mass is −0.09 mg/cm², and the change of the cast iron mass is −0.07 mg/cm², and the change of the steel mass is 0.00 mg/cm², and the change of the brass mass is −0.02 mg/cm², and the change of the solder mass is −0.10 mg/cm², and the change of the copper mass is −0.04 mg/cm². In other words, the test results show the antifreeze of the embodiment 25 has higher corrosion inhibition effect on metals than the antifreeze of comparative examples 1 to 5.

Embodiment 26

The antifreeze shown in the embodiment 26 includes 1.2 parts by weight of the sample 2 par 100 parts by weight of propylene glycol.

The antifreeze shown in the embodiment 26 includes 0.1 parts by weight of the sample 5 par 100 parts by weight of propylene glycol. The antifreeze shown in the embodiment 26 includes 0.05 parts by weight of the sample 11 par 100 parts by weight of propylene glycol. Furthermore, the sample 12 is added so that pH will be 7.8. The sample 13 is added so that the concentration of sample 1 will be 30% by weight.

At the antifreeze shown in the embodiment 26, according to the test of corrosive behavior of metals, the change of the aluminum casting mass is $-0.07$ mg/cm$^2$, and the change of the cast iron mass is $-0.05$ mg/cm$^2$, and the change of the steel mass is $-0.02$ mg/cm$^2$, and the change of the brass mass is $-0.02$ mg/cm$^2$, and the change of the solder mass is $-0.08$ mg/cm$^2$, and the change of the copper mass is $-0.03$ mg/cm$^2$. In other words, the test results show the antifreeze of the embodiment 26 has higher corrosion inhibition effect on metals than the antifreeze of comparative examples 1 to 5.

Embodiment 27

The antifreeze shown in the embodiment 27 includes 1.2 parts by weight of the sample 2 par 100 parts by weight of propylene glycol.

The antifreeze shown in the embodiment 27 includes 0.1 parts by weight of the sample 5 par 100 parts by weight of propylene glycol. The antifreeze shown in the embodiment 27 includes 0.5 parts by weight of the sample 11 par 100 parts by weight of propylene glycol. Furthermore, the sample 12 is added so that pH will be 7.8. The sample 13 is added so that the concentration of sample 1 will be 30% by weight.

At the antifreeze shown in the embodiment 27, according to the test of corrosive behavior of metals, the change of the aluminum casting mass is $-0.09$ mg/cm$^2$, and the change of the cast iron mass is $-0.03$ mg/cm$^2$, and the change of the steel mass is 0.00 mg/cm$^2$, and the change of the brass mass is $-0.02$ mg/cm$^2$, and the change of the solder mass is $-0.08$ mg/cm$^2$, and the change of the copper mass is $-0.03$ mg/cm$^2$. In other words, the test results show the antifreeze of the embodiment 27 has higher corrosion inhibition effect on metals than the antifreeze of comparative examples 1 to 5.

Embodiment 28

The antifreeze shown in the embodiment 28 includes 1.2 parts by weight of the sample 2 par 100 parts by weight of propylene glycol.

The antifreeze shown in the embodiment 28 includes 0.1 parts by weight of the sample 5 par 100 parts by weight of propylene glycol. The antifreeze shown in the embodiment 28 includes 0.9 parts by weight of the sample 11 par 100 parts by weight of propylene glycol. Furthermore, the sample 12 is added so that pH will be 7.8. The sample 13 is added so that the concentration of sample 1 will be 30% by weight.

At the antifreeze shown in the embodiment 28, according to the test of corrosive behavior of metals, the change of the aluminum casting mass is $-0.12$ mg/cm$^2$, and the change of the cast iron mass is $-0.10$ mg/cm$^2$, and the change of the steel mass is $-0.02$ mg/cm$^2$, and the change of the brass mass is $-0.01$ mg/cm$^2$, and the change of the solder mass is $-0.08$ mg/cm$^2$, and the change of the copper mass is $-0.02$ mg/cm$^2$. In other words, the test results show the antifreeze of the embodiment 28 has higher corrosion inhibition effect on metals than the antifreeze of comparative examples 1 to 5.

Embodiment 29

The antifreeze shown in the embodiment 29 includes 1.2 parts by weight of the sample 2 par 100 parts by weight of propylene glycol.

The antifreeze shown in the embodiment 29 includes 0.1 parts by weight of the sample 5 par 100 parts by weight of propylene glycol. The antifreeze shown in the embodiment 29 includes 1.0 parts by weight of the sample 7 par 100 parts by weight of propylene glycol. The antifreeze shown in the embodiment 29 includes 0.5 parts by weight of the sample 11 par 100 parts by weight of propylene glycol. Furthermore, the sample 12 is added so that pH will be 7.8. The sample 13 is added so that the concentration of sample 1 will be 30% by weight.

At the antifreeze shown in the embodiment 29, according to the test of corrosive behavior of metals, the change of the aluminum casting mass is $-0.01$ mg/cm$^2$, and the change of the cast iron mass is $-0.03$ mg/cm$^2$, and the change of the steel mass is 0.00 mg/cm$^2$, and the change of the brass mass is $-0.01$ mg/cm$^2$, and the change of the solder mass is $-0.08$ mg/cm$^2$, and the change of the copper mass is $-0.02$ mg/cm$^2$. In other words, the test results show the antifreeze of the embodiment 29 has higher corrosion inhibition effect on metals than the antifreeze of comparative examples 1 to 5.

Embodiment 30

FIG. 5 shows the composition of embodiments 30 to 35 and the results of corrosion behavior test on metals. The antifreeze shown in the embodiment 30 includes 1.2 parts by weight of the sample 14 par 100 parts by weight of propylene glycol. The antifreeze shown in the embodiment 30 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 30, according to the test of corrosive behavior of metals, the change of the aluminum casting mass is $-0.26$ mg/cm$^2$, and the change of the cast iron mass is $-0.07$ mg/cm$^2$, and the change of the steel mass is $-0.03$ mg/cm$^2$, and the change of the brass mass is $-0.06$ mg/cm$^2$, and the change of the solder mass is $-0.21$ mg/cm$^2$, and the change of the copper mass is $-0.09$ mg/cm$^2$. In other words, the test results show the antifreeze of the embodiment 30 has higher corrosion inhibition effect on metals than the antifreeze of comparative examples 1 to 5.

Embodiment 31

The antifreeze shown in the embodiment 31 includes 1.2 parts by weight of the sample 15 par 100 parts by weight of propylene glycol. The antifreeze shown in the embodiment 31 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 31, according to the test of corrosive behavior of metals, the change of the aluminum casting mass is $-0.25$ mg/cm$^2$, and the change of the cast iron mass is $-0.08$ mg/cm$^2$, and the change of the steel mass is $-0.05$ mg/cm$^2$, and the change of the brass mass is $-0.04$ mg/cm$^2$, and the change of the solder mass is $-0.17$ mg/cm$^2$, and the change of the copper mass is $-0.08$ mg/cm$^2$.

In other words, the test results show the antifreeze of the embodiment 31 has higher corrosion inhibition effect on metals than the antifreeze of comparative examples 1 to 5.

Embodiment 32

The antifreeze shown in the embodiment 32 includes 1.2 parts by weight of the sample 16 par 100 parts by weight of propylene glycol. The antifreeze shown in the embodiment 32 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 32, according to the test of corrosive behavior of metals, the change of the aluminum casting mass is −0.25 mg/cm$^2$, and the change of the cast iron mass is −0.14 mg/cm$^2$, and the change of the steel mass is −0.11 mg/cm$^2$, and the change of the brass mass is −0.02 mg/cm$^2$, and the change of the solder mass is −0.10 mg/cm$^2$, and the change of the copper mass is −0.04 mg/cm$^2$. In other words, the test results show the antifreeze of the embodiment 32 has higher corrosion inhibition effect on metals than the antifreeze of comparative examples 1 to 5.

Embodiment 33

The antifreeze shown in the embodiment 33 includes 1.2 parts by weight of the sample 17 par 100 parts by weight of propylene glycol. The antifreeze shown in the embodiment 33 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 33, according to the test of corrosive behavior of metals, the change of the aluminum casting mass is −0.2 mg/cm$^2$, and the change of the cast iron mass is −0.07 mg/cm$^2$, and the change of the steel mass is −0.03 mg/cm$^2$, and the change of the brass mass is −0.04 mg/cm$^2$, and the change of the solder mass is −0.15 mg/cm$^2$, and the change of the copper mass is −0.09 mg/cm$^2$. In other words, the test results show the antifreeze of the embodiment 33 has higher corrosion inhibition effect on metals than the antifreeze of comparative examples 1 to 5.

Embodiment 34

The antifreeze shown in the embodiment 34 includes 1.2 parts by weight of the sample 18 par 100 parts by weight of propylene glycol. The antifreeze shown in the embodiment 34 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 34, according to the test of corrosive behavior of metals, the change of the aluminum casting mass is −0.28 mg/cm$^2$, and the change of the cast iron mass is −0.09 mg/cm$^2$, and the change of the steel mass is −0.05 mg/cm$^2$, and the change of the brass mass is −0.05 mg/cm$^2$, and the change of the solder mass is −0.17 mg/cm$^2$, and the change of the copper mass is −0.11 mg/cm$^2$. In other words, the test results show the antifreeze of the embodiment 34 has higher corrosion inhibition effect on metals than the antifreeze of comparative examples 1 to 5.

Embodiment 35

The antifreeze shown in the embodiment 35 includes 0.6 parts by weight of the sample 2 par 100 parts by weight of propylene glycol.

The antifreeze shown in the embodiment 35 includes 0.6 parts by weight of the sample 14 par 100 parts by weight of propylene glycol. The antifreeze shown in the embodiment 35 includes 0.1 parts by weight of the sample 5 par 100 parts by weight of propylene glycol. Furthermore, the sample 12 is added so that pH will be 7.8. The sample 13 is added so that the concentration of sample 1 will be 30% by weight.

At the antifreeze shown in the embodiment 35, according to the test of corrosive behavior of metals, the change of the aluminum casting mass is −0.21 mg/cm$^2$, and the change of the cast iron mass is −0.10 mg/cm$^2$, and the change of the steel mass is −0.04 mg/cm$^2$, and the change of the brass mass is −0.05 mg/cm$^2$, and the change of the solder mass is −0.14 mg/cm$^2$, and the change of the copper mass is −0.10 mg/cm$^2$. In other words, the test results show the antifreeze of the embodiment 35 has higher corrosion inhibition effect on metals than the antifreeze of comparative examples 1 to 5.

Embodiment 36

FIG. 6 shows the composition of embodiments 36 to 42 and the results of corrosion behavior test on metals. The antifreeze shown in the embodiment 36 includes 1.2 parts by weight of the sample 2 par 100 parts by weight of propylene glycol.

The antifreeze shown in the embodiment 36 includes 0.1 parts by weight of the sample 5 par 100 parts by weight of propylene glycol. The antifreeze shown in the embodiment 36 includes 1.0 parts by weight of the sample 19 par 100 parts by weight of propylene glycol. Furthermore, the sample 12 is added so that pH will be 7.8. The sample 13 is added so that the concentration of sample 1 will be 30% by weight.

At the antifreeze shown in the embodiment 36, according to the test of corrosive behavior of metals, the change of the aluminum casting mass is −0.10 mg/cm$^2$, and the change of the cast iron mass is −0.07 mg/cm$^2$, and the change of the steel mass is −0.02 mg/cm$^2$, and the change of the brass mass is −0.03 mg/cm$^2$, and the change of the solder mass is −0.11 mg/cm$^2$, and the change of the copper mass is −0.05 mg/cm$^2$. In other words, the test results show the antifreeze of the embodiment 36 has a higher corrosion inhibition effect on metals than the antifreeze of comparative examples 1 to 5.

Embodiment 37

The antifreeze shown in the embodiment 37 includes 1.2 parts by weight of the sample 2 par 100 parts by weight of propylene glycol.

The antifreeze shown in the embodiment 37 includes 0.1 parts by weight of the sample 5 par 100 parts by weight of propylene glycol. The antifreeze shown in the embodiment 37 includes 1.0 parts by weight of the sample 20 par 100 parts by weight of propylene glycol. Furthermore, the sample 12 is added so that pH will be 7.8. The sample 13 is added so that the concentration of sample 1 will be 30% by weight.

At the antifreeze shown in the embodiment 37, according to the test of corrosive behavior of metals, the change of the aluminum casting mass is −0.09 mg/cm$^2$, and the change of the cast iron mass is −0.07 mg/cm$^2$, and the change of the steel mass is −0.03 mg/cm$^2$, and the change of the brass mass is −0.02 mg/cm$^2$, and the change of the solder mass is −0.10 mg/cm$^2$, and the change of the copper mass is −0.04 mg/cm$^2$. In other words, the test results show the antifreeze of the embodiment 37 has higher corrosion inhibition effect on metals than the antifreeze of comparative examples 1 to 5.

Embodiment 38

The antifreeze shown in the embodiment 38 includes 1.2 parts by weight of the sample 2 par 100 parts by weight of propylene glycol.

The antifreeze shown in the embodiment 38 includes 0.1 parts by weight of the sample 5 par 100 parts by weight of propylene glycol. The antifreeze shown in the embodiment 38 includes 1.0 parts by weight of the sample 21 par 100 parts by weight of propylene glycol. Furthermore, the sample 12 is added so that pH will be 7.8. The sample 13 is added so that the concentration of sample 1 will be 30% by weight.

At the antifreeze shown in the embodiment 38, according to the test of corrosive behavior of metals, the change of the aluminum casting mass is $-0.10$ mg/cm$^2$, and the change of the cast iron mass is $-0.09$ mg/cm$^2$, and the change of the steel mass is $-0.04$ mg/cm$^2$, and the change of the brass mass is $0.00$ mg/cm$^2$, and the change of the solder mass is $-0.10$ mg/cm$^2$, and the change of the copper mass is $-0.02$ mg/cm$^2$. In other words, the test results show the antifreeze of the embodiment 38 has higher corrosion inhibition effect on metals than the antifreeze of comparative examples 1 to 5.

Embodiment 39

The antifreeze shown in the embodiment 39 includes 1.2 parts by weight of the sample 2 par 100 parts by weight of propylene glycol.

The antifreeze shown in the embodiment 39 includes 0.1 parts by weight of the sample 5 par 100 parts by weight of propylene glycol. The antifreeze shown in the embodiment 39 includes 1.0 parts by weight of the sample 22 par 100 parts by weight of propylene glycol. Furthermore, the sample 12 is added so that pH will be 7.8. The sample 13 is added so that the concentration of sample 1 will be 30% by weight.

At the antifreeze shown in the embodiment 39, according to the test of corrosive behavior of metals, the change of the aluminum casting mass is $-0.12$ mg/cm$^2$, and the change of the cast iron mass is $-0.08$ mg/cm$^2$, and the change of the steel mass is $-0.02$ mg/cm$^2$, and the change of the brass mass is $-0.03$ mg/cm$^2$, and the change of the solder mass is $-0.16$ mg/cm$^2$, and the change of the copper mass is $-0.05$ mg/cm$^2$. In other words, the test results show the antifreeze of the embodiment 39 has higher corrosion inhibition effect on metals than the antifreeze of comparative examples 1 to 5.

Embodiment 40

The antifreeze shown in the embodiment 40 includes 1.2 parts by weight of the sample 2 par 100 parts by weight of propylene glycol.

The antifreeze shown in the embodiment 40 includes 0.1 parts by weight of the sample 5 par 100 parts by weight of propylene glycol. The antifreeze shown in the embodiment 40 includes 1.0 parts by weight of the sample 23 par 100 parts by weight of propylene glycol. Furthermore, the sample 12 is added so that pH will be 7.8. The sample 13 is added so that the concentration of sample 1 will be 30% by weight.

At the antifreeze shown in the embodiment 40, according to the test of corrosive behavior of metals, the change of the aluminum casting mass is $-0.10$ mg/cm$^2$, and the change of the cast iron mass is $-0.07$ mg/cm$^2$, and the change of the steel mass is $-0.03$ mg/cm$^2$, and the change of the brass mass is $-0.03$ mg/cm$^2$, and the change of the solder mass is $-0.09$ mg/cm$^2$, and the change of the copper mass is $-0.05$ mg/cm$^2$. In other words, the test results show the antifreeze of the embodiment 40 has higher corrosion inhibition effect on metals than the antifreeze of comparative examples 1 to 5.

Embodiment 41

The antifreeze shown in the embodiment 41 includes 1.2 parts by weight of the sample 2 par 100 parts by weight of propylene glycol.

The antifreeze shown in the embodiment 41 includes 0.1 parts by weight of the sample 5 par 100 parts by weight of propylene glycol. The antifreeze shown in the embodiment 41 includes 1.0 parts by weight of the sample 24 par 100 parts by weight of propylene glycol. Furthermore, the sample 12 is added so that pH will be 7.8. The sample 13 is added so that the concentration of sample 1 will be 30% by weight.

At the antifreeze shown in the embodiment 41, according to the test of corrosive behavior of metals, the change of the aluminum casting mass is $-0.09$ mg/cm$^2$, and the change of the cast iron mass is $-0.06$ mg/cm$^2$, and the change of the steel mass is $-0.01$ mg/cm$^2$, and the change of the brass mass is $-0.03$ mg/cm$^2$, and the change of the solder mass is $-0.11$ mg/cm$^2$, and the change of the copper mass is $-0.05$ mg/cm$^2$. In other words, the test results show the antifreeze of the embodiment 41 has higher corrosion inhibition effect on metals than the antifreeze of comparative examples 1 to 5.

Embodiment 42

The antifreeze shown in the embodiment 42 includes 1.2 parts by weight of the sample 2 par 100 parts by weight of propylene glycol.

The antifreeze shown in the embodiment 42 includes 0.1 parts by weight of the sample 5 par 100 parts by weight of propylene glycol. The antifreeze shown in the embodiment 42 includes 0.05 parts by weight of the sample 7 par 100 parts by weight of propylene glycol. The antifreeze shown in the embodiment 42 includes 0.05 parts by weight of the sample 19 par 100 parts by weight of propylene glycol.

Furthermore, the sample 12 is added so that pH will be 7.8. The sample 13 is added so that the concentration of sample 1 will be 30% by weight.

At the antifreeze shown in the embodiment 42, according to the test of corrosive behavior of metals, the change of the aluminum casting mass is $-0.09$ mg/cm$^2$, and the change of the cast iron mass is $-0.08$ mg/cm$^2$, and the change of the steel mass is $-0.03$ mg/cm$^2$, and the change of the brass mass is $-0.03$ mg/cm$^2$, and the change of the solder mass is $-0.16$ mg/cm$^2$, and the change of the copper mass is $-0.06$ mg/cm$^2$. In other words, the test results show the antifreeze of the embodiment 42 has higher corrosion inhibition effect on metals than the antifreeze of comparative examples 1 to 5.

Embodiment 43

FIG. 7 shows the composition of embodiments 43 to 50 and the results of corrosion behavior test on metals. The antifreeze shown in the embodiment 43 includes 1.2 parts by weight of the sample 2 par 100 parts by weight of propylene glycol.

The antifreeze shown in the embodiment 43 includes 0.1 parts by weight of the sample 5 par 100 parts by weight of propylene glycol. The antifreeze shown in the embodiment 43 includes 0.5 parts by weight of the sample 25 par 100 parts by weight of propylene glycol. Furthermore, the sample 12 is added so that pH will be 7.8. The sample 13 is added so that the concentration of sample 1 will be 30% by weight.

At the antifreeze shown in the embodiment 43, according to the test of corrosive behavior of metals, the change of the aluminum casting mass is −0.10 mg/cm², and the change of the cast iron mass is −0.04 mg/cm², and the change of the steel mass is −0.01 mg/cm², and the change of the brass mass is −0.02 mg/cm², and the change of the solder mass is −0.07 mg/cm², and the change of the copper mass is −0.04 mg/cm². In other words, the test results show the antifreeze of the embodiment 43 has higher corrosion inhibition effect on metals than the antifreeze of comparative examples 1 to 5.

Embodiment 44

The antifreeze shown in the embodiment 44 includes 1.2 parts by weight of the sample 2 par 100 parts by weight of propylene glycol.

The antifreeze shown in the embodiment 44 includes 0.1 parts by weight of the sample 5 par 100 parts by weight of propylene glycol. The antifreeze shown in the embodiment 44 includes 0.5 parts by weight of the sample 26 par 100 parts by weight of propylene glycol. Furthermore, the sample 12 is added so that pH will be 7.8. The sample 13 is added so that the concentration of sample 1 will be 30% by weight.

At the antifreeze shown in the embodiment 44, according to the test of corrosive behavior of metals, the change of the aluminum casting mass is −0.09 mg/cm², and the change of the cast iron mass is −0.05 mg/cm², and the change of the steel mass is −0.03 mg/cm², and the change of the brass mass is −0.03 mg/cm², and the change of the solder mass is −0.06 mg/cm², and the change of the copper mass is −0.05 mg/cm². In other words, the test results show the antifreeze of the embodiment 44 has higher corrosion inhibition effect on metals than the antifreeze of comparative examples 1 to 5.

Embodiment 45

The antifreeze shown in the embodiment 45 includes 1.2 parts by weight of the sample 2 par 100 parts by weight of propylene glycol.

The antifreeze shown in the embodiment 45 includes 0.1 parts by weight of the sample 5 par 100 parts by weight of propylene glycol. The antifreeze shown in the embodiment 45 includes 0.5 parts by weight of the sample 27 par 100 parts by weight of propylene glycol. Furthermore, the sample 12 is added so that pH will be 7.8. The sample 13 is added so that the concentration of sample 1 will be 30% by weight.

At the antifreeze shown in the embodiment 45, according to the test of corrosive behavior of metals, the change of the aluminum casting mass is −0.08 mg/cm², and the change of the cast iron mass is −0.07 mg/cm², and the change of the steel mass is −0.06 mg/cm², and the change of the brass mass is −0.03 mg/cm², and the change of the solder mass is −0.09 mg/cm², and the change of the copper mass is −0.04 mg/cm². In other words, the test results show the antifreeze of the embodiment 45 has higher corrosion inhibition effect on metals than the antifreeze of comparative examples 1 to 5.

Embodiment 46

The antifreeze shown in the embodiment 46 includes 1.2 parts by weight of the sample 2 par 100 parts by weight of propylene glycol.

The antifreeze shown in the embodiment 46 includes 0.1 parts by weight of the sample 5 par 100 parts by weight of propylene glycol. The antifreeze shown in the embodiment 46 includes 0.25 parts by weight of the sample 11 par 100 parts by weight of propylene glycol. The antifreeze shown in the embodiment 46 includes 0.25 parts by weight of the sample 25 par 100 parts by weight of propylene glycol. Furthermore, the sample 12 is added so that pH will be 7.8. The sample 13 is added so that the concentration of sample 1 will be 30% by weight.

At the antifreeze shown in the embodiment 46, according to the test of corrosive behavior of metals, the change of the aluminum casting mass is −0.09 mg/cm², and the change of the cast iron mass is −0.03 mg/cm², and the change of the steel mass is −0.01 mg/cm², and the change of the brass mass is −0.02 mg/cm², and the change of the solder mass is −0.07 mg/cm², and the change of the copper mass is −0.03 mg/cm². In other words, the test results show the antifreeze of embodiment 46 has higher corrosion inhibition effect on metals than the antifreeze of comparative examples 1 to 5.

Embodiment 47

The antifreeze shown in the embodiment 47 includes 1.2 parts by weight of the sample 2 par 100 parts by weight of propylene glycol.

The antifreeze shown in the embodiment 47 includes 0.1 parts by weight of the sample 5 par 100 parts by weight of propylene glycol. The antifreeze shown in the embodiment 47 includes 1.0 parts by weight of the sample 7 par 100 parts by weight of propylene glycol. The antifreeze shown in the embodiment 47 includes 0.5 parts by weight of the sample 25 par 100 parts by weight of propylene glycol. Furthermore, the sample 12 is added so that pH will be 7.8. The sample 13 is added so that the concentration of sample 1 will be 30% by weight.

At the antifreeze shown in the embodiment 47, according to the test of corrosive behavior of metals, the change of the aluminum casting mass is −0.01 mg/cm², and the change of the cast iron mass is −0.04 mg/cm², and the change of the steel mass is −0.03 mg/cm², and the change of the brass mass is −0.01 mg/cm², and the change of the solder mass is −0.09 mg/cm², and the change of the copper mass is −0.02 mg/cm². In other words, the test results show the antifreeze of the embodiment 47 has higher corrosion inhibition effect on metals than the antifreeze of comparative examples 1 to 5.

Embodiment 48

The antifreeze shown in the embodiment 48 includes 1.2 parts by weight of the sample 2 par 100 parts by weight of propylene glycol.

The antifreeze shown in the embodiment 48 includes 0.1 parts by weight of the sample 5 par 100 parts by weight of propylene glycol. The antifreeze shown in the embodiment 48 includes 1.0 parts by weight of the sample 7 par 100 parts by weight of propylene glycol. The antifreeze shown in the embodiment 48 includes 0.5 parts by weight of the sample 26 par 100 parts by weight of propylene glycol. Furthermore, the sample 12 is added so that pH will be 7.8. The sample 13 is added so that the concentration of sample 1 will be 30% by weight.

At the antifreeze shown in the embodiment 48, according to the test of corrosive behavior of metals, the change of the aluminum casting mass is −0.01 mg/cm², and the change of the cast iron mass is −0.02 mg/cm², and the change of the steel mass is −0.01 mg/cm², and the change of the brass mass is 0.00 mg/cm², and the change of the solder mass is −0.06 mg/cm², and the change of the copper mass is −0.02 mg/cm². In other words, the test results show the antifreeze of the embodiment 48 has higher corrosion inhibition effect on metals than the antifreeze of comparative examples 1 to 5.

Embodiment 49

The antifreeze shown in the embodiment 49 includes 1.2 parts by weight of the sample 2 par 100 parts by weight of propylene glycol.

The antifreeze shown in the embodiment 49 includes 0.1 parts by weight of the sample 5 par 100 parts by weight of propylene glycol. The antifreeze shown in the embodiment 49 includes 1.0 parts by weight of the sample 7 par 100 parts by weight of propylene glycol. The antifreeze shown in the embodiment 49 includes 0.5 parts by weight of the sample 27 par 100 parts by weight of propylene glycol. Furthermore, the sample 12 is added so that pH will be 7.8. The sample 13 is added so that the concentration of sample 1 will be 30% by weight.

At the antifreeze shown in the embodiment 49, according to the test of corrosive behavior of metals, the change of the aluminum casting mass is $-0.02$ mg/cm$^2$, and the change of the cast iron mass is $-0.06$ mg/cm$^2$, and the change of the steel mass is $-0.03$ mg/cm$^2$, and the change of the brass mass is $-0.01$ mg/cm$^2$, and the change of the solder mass is $-0.08$ mg/cm$^2$, and the change of the copper mass is $-0.02$ mg/cm$^2$. In other words, the test results show the antifreeze of the embodiment 49 has a higher corrosion inhibition effect on metals than the antifreeze of comparative examples 1 to 5.

Embodiment 50

The antifreeze shown in the embodiment 50 includes 1.2 parts by weight of the sample 2 par 100 parts by weight of propylene glycol.

The antifreeze shown in the embodiment 50 includes 0.1 parts by weight of the sample 5 par 100 parts by weight of propylene glycol. The antifreeze shown in the embodiment 50 includes 1.0 parts by weight of the sample 7 par 100 parts by weight of propylene glycol. The antifreeze shown in the embodiment 50 includes 0.25 parts by weight of the sample 11 par 100 parts by weight of propylene glycol.

The antifreeze shown in the embodiment 50 includes 0.25 parts by weight of the sample 25 par 100 parts by weight of propylene glycol.

Furthermore, the sample 12 is added so that pH will be 7.8. The sample 13 is added so that the concentration of sample 1 will be 30% by weight.

At the antifreeze shown in the embodiment 50, according to the test of corrosive behavior of metals, the change of the aluminum casting mass is $-0.02$ mg/cm$^2$, and the change of the cast iron mass is $-0.03$ mg/cm$^2$, and the change of the steel mass is $-0.02$ mg/cm$^2$, and the change of the brass mass is $-0.01$ mg/cm$^2$, and the change of the solder mass is $-0.06$ mg/cm$^2$, and the change of the copper mass is $-0.02$ mg/cm$^2$. In other words, the test results show the antifreeze of the embodiment 50 has higher corrosion inhibition effect on metals than the antifreeze of comparative examples 1 to 5.

What is claimed is:

1. An antifreeze comprising:
   (A) a propylene glycol;
   (B) a first material; and
   (C) a second material,
   wherein said first material is selected from the group consisting of normal aliphatic dicarboxylic acid in which number of carbon atoms is from 10 to 12, salt of said normal aliphatic dicarboxylic acid, and mixture of said normal aliphatic dicarboxylic acid and said salt of said normal aliphatic dicarboxylic acid, and
   said second material is selected from the group consisting of benzimidazole compound which has a benzimidazole skeleton, salt of said benzimidazole compound, triazine compound which has a triazine skeleton and has a mercapto group, salt of said triazine compound, and mixture of a plurality of materials selected from the group consisting of said benzimidazole compound, said salt of benzimidazole compound, said triazine compound, and said salt of triazine compound,
   wherein said benzimidazole compound is thiabendazole, and said triazine compound is trimercapto-s-triazine.

2. The antifreeze according to claim 1, wherein said benzimidazole compound is represented by formula 1:

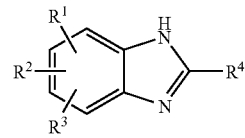

wherein a first group $R^1$ is selected from the group consisting of hydrogen atom, a hydroxyl group, a carboxyl group, and a substituent,
   a second group $R^2$ is selected from the group consisting of a hydrogen atom, a hydroxyl group, a carboxyl group, and said substituent,
   a third group $R^3$ is selected from the group consisting of hydrogen atom, a hydroxyl group, a carboxyl group, and said substituent,
   a forth group $R^4$ is selected from the group consisting of hydrogen atom, a hydrocarbon group, a group including sulfur, a group including nitrogen, and a group including sulfur and nitrogen, and
   said substituent is a group selected from the group consisting of said hydrocarbon group, a group in which part of hydrogen atoms of a hydrocarbon group is substituted by a hydroxyl group, a group in which part of hydrogen atoms of a hydrocarbon group is substituted by a carboxyl group, and a group in which part of hydrogen atoms of a hydrocarbon group is substituted by a hydroxyl group and the other hydrogen atom is substituted by a carboxyl group.

3. The antifreeze according to claim 1, wherein said triazine compound is represented by formula 2:

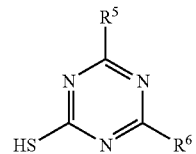

wherein a fifth group $R^5$ is selected from the group consisting of hydrogen, a hydrocarbon group, a group including sulfur, a group including nitrogen, and a group including sulfur and nitrogen, and
   a sixth group $R^6$ is selected from the group consisting of hydrogen, a hydrocarbon group, a group including sulfur, a group including nitrogen, and a group including sulfur and nitrogen.

4. The antifreeze according to claim 1, wherein an amount of said first material ranges 0.1 to 5.0 parts by weight par 100 parts by weight of propylene glycol, and an amount of said second material ranges 0.01 to 2.0 parts by weight par 100 parts by weight of propylene glycol.

5. The antifreeze according to claim 1, further comprising a third material selected from the group consisting of aromatic carboxylic acid and salt of said aromatic carboxylic acid, wherein said aromatic carboxylic acid is represented by formula 3:

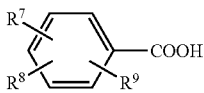

wherein a seventh group $R^7$ is selected from the group consisting of hydrogen, a hydroxyl group, an amino group, and a hydrocarbon group in which a number of carbon atoms is from 1 to 6, an 8th group $R^8$ is selected from the group consisting of hydrogen, a hydroxyl group, an amino group, and a hydrocarbon group in which a number of carbon atoms is from 1 to 6, and a 9th group $R^9$ is selected from the group consisting of hydrogen, a hydroxyl group, an amino group, and a hydrocarbon group in which a number of carbon atoms is from 1 to 6.

6. The antifreeze according to claim 5, wherein an amount of said third material ranges 0.02 to 4.0 parts by weight par 100 parts by weight propylene glycol.

7. The antifreeze according to claim 1, further comprising a fourth material selected from the group consisting of nitric acid, salt of a nitric acid, and mixture of a nitric acid and nitric acid salt.

8. The antifreeze according to claim 7, further comprising a third material selected from the group consisting of aromatic carboxylic acid and salt of said aromatic carboxylic acid, wherein said aromatic carboxylic acid is represented by formula 4:

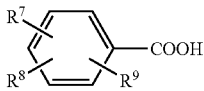

wherein a seventh group $R^7$ is selected from the group consisting of hydrogen, a hydroxyl group, an amino group, and a hydrocarbon group in which a number of carbon atoms is from 1 to 6, an 8th group $R^8$ is selected from the group consisting of hydrogen, a hydroxyl group, an amino group, and a hydrocarbon group in which a number of carbon atoms is from 1 to 6, and a 9th group $R^9$ is selected from the group consisting of hydrogen, a hydroxyl group, an amino group, and a hydrocarbon group in which a number of carbon atoms is from 1 to 6.

9. The antifreeze according to claim 7, wherein an amount of said fourth material ranges 0.02 to 1.0 parts by weight par 100 parts by weight of propylene glycol.

10. The antifreeze according to claim 1, further comprising water and pH of said antifreeze is from 7.0 to 9.0.

11. The antifreeze according to claim 10, further comprising a third material selected from the group consisting of aromatic carboxylic acid and salt of said aromatic carboxylic acid, wherein said aromatic carboxylic acid is represented by formula 5:

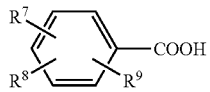

wherein a seventh group $R^7$ is selected from the group consisting of hydrogen, a hydroxyl group, an amino group, and a hydrocarbon group in which a number of carbon atoms is from 1 to 6, an 8th group $R^8$ is selected from the group consisting of hydrogen, a hydroxyl group, an amino group, and a hydrocarbon group in which a number of carbon atoms is from 1 to 6, and a 9th group $R^9$ is selected from the group consisting of hydrogen, a hydroxyl group, an amino group, and a hydrocarbon group in which a number of carbon atoms is from 1 to 6.

12. The antifreeze according to claim 11, further comprising a fourth material selected from the group consisting of nitric acid, salt of a nitric acid, and mixture of a nitric acid and nitric acid salt.

13. The antifreeze according to claim 10, further comprising a fourth material selected from the group consisting of nitric acid, salt of a nitric acid, and mixture of a nitric acid and nitric acid salt.

14. The antifreeze according to claim 10, wherein a concentration of said propylene glycol ranges 25 to 65% by weight.

15. The antifreeze according to claim 1, wherein a weighted ratio (X) of the weight fraction of benzimidazole compound to the weight fraction of triazine compound is represented by the following formula:

$$X=T+3S,$$

wherein said T is a weight of said benzimidazole compound and said salt of said benzimidazole compound per 100 weight of propylene glycol, and said S is a weight of said triazine compound and said salt of said triazine compound per 100 weight of propylene glycol, and X has a value from 0.06 to 1.2.

16. The antifreeze according to claim 15, wherein said X has a value from 0.08 to 0.9.

* * * * *

UNITED STATES PATENT AND TRADEMARK OFFICE
CERTIFICATE OF CORRECTION

PATENT NO.      : 7,645,394 B2                                      Page 1 of 1
APPLICATION NO. : 11/002892
DATED           : January 12, 2010
INVENTOR(S)     : Matsuoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this

Sixteenth Day of November, 2010

David J. Kappos
*Director of the United States Patent and Trademark Office*